(12) United States Patent
Miller et al.

(10) Patent No.: US 11,388,909 B2
(45) Date of Patent: Jul. 19, 2022

(54) APPARATUS AND METHOD FOR POST-EXTRUSION FILLING AND CLOSURE OF AN EXTRUDATE

(71) Applicant: Pure Nature Foods, LLC, Woodland, CA (US)

(72) Inventors: Henry Zollinger Miller, Machesney Park, IL (US); Miguel A. Reyna, Arbuckle, CA (US); Craig W. Bair, Greensboro, NC (US)

(73) Assignee: Pure Nature Foods, LLC, Woodland, CA (US)

( * ) Notice: Subject to any disclaimer, the term of this patent is extended or adjusted under 35 U.S.C. 154(b) by 709 days.

(21) Appl. No.: 16/150,149

(22) Filed: Oct. 2, 2018

(65) Prior Publication Data

US 2020/0100523 A1  Apr. 2, 2020

(51) Int. Cl.

| A23G 3/20 | (2006.01) |
| A23P 30/20 | (2016.01) |
| A23G 3/34 | (2006.01) |
| A23G 3/54 | (2006.01) |
| A21C 11/16 | (2006.01) |
| B29C 48/09 | (2019.01) |
| B29C 48/00 | (2019.01) |
| B29C 48/03 | (2019.01) |

(52) U.S. Cl.
CPC ............ *A23G 3/2015* (2013.01); *A21C 11/16* (2013.01); *A23G 3/0068* (2013.01); *A23G 3/545* (2013.01);
(Continued)

(58) Field of Classification Search
CPC ... B29C 48/0022; B29C 48/09; B29C 48/131; B29C 48/16; B29C 48/152;
(Continued)

(56) References Cited

U.S. PATENT DOCUMENTS

| 3,269,079 A | 8/1966 | Schmied |
| 4,081,943 A | 4/1978 | Leasure et al. |

(Continued)

FOREIGN PATENT DOCUMENTS

| GB | 591402 A | 8/1947 |
| GB | 936670 A | 9/1963 |

(Continued)

OTHER PUBLICATIONS

International Search Report dated Dec. 18, 2019 for International Application No. PCT/US2019/054080, 16 pages.

*Primary Examiner* — Xiao S Zhao
*Assistant Examiner* — Joseph S Leyson
(74) *Attorney, Agent, or Firm* — Seed Intellectual Property Law Group LLP

(57) ABSTRACT

An apparatus and method for post-extrusion filling and closing of an extrudate includes a feeder arranged in relation to an extruded rope of material flowing from an extrusion die of an extruder, wherein the rope of material has an opening that can receive a filler material. The feeder deposits the filler material into the opening of the rope of material as the rope of material flows by the feeder. A former receives the rope of material after the feeder has deposited the filler material into the opening of the rope. The former shapes the rope of material and close a portion or all of the rope around at least a portion of the deposited filler material to retain the filler material within the rope. A cutter may axially cut the rope to form the opening. A finisher may cut the shaped rope into portions containing the deposited filler material.

34 Claims, 20 Drawing Sheets

(52) U.S. Cl.
CPC .......... *A23P 30/20* (2016.08); *B29C 48/0022* (2019.02); *B29C 48/022* (2019.02); *B29C 48/09* (2019.02); *B29C 48/131* (2019.02); *A23G 2220/20* (2013.01); *A23G 2220/22* (2013.01)

(58) Field of Classification Search
CPC .... A23G 3/0068; A23G 3/2015; A23G 3/545; A23G 2220/22; A21C 11/16; A21C 9/061; A23P 30/20; A23P 20/25; B65B 9/20
See application file for complete search history.

(56) References Cited

U.S. PATENT DOCUMENTS

| | | | |
|---|---|---|---|
| 4,124,339 A * | 11/1978 | Bernard | A22C 7/00 425/133.1 |
| 4,569,848 A * | 2/1986 | Giorgetti | A21D 13/37 426/103 |
| 4,618,499 A * | 10/1986 | Wainwright | A21C 9/061 426/283 |
| 4,847,098 A | 7/1989 | Langler | |
| 5,695,797 A | 12/1997 | Geromini et al. | |
| 6,312,746 B2 | 11/2001 | Paluch | |
| 7,320,807 B2 | 1/2008 | Asher et al. | |
| 8,944,798 B2 * | 2/2015 | Gimmler | B29C 48/18 425/133.1 |
| 9,380,804 B2 | 7/2016 | Oufnac et al. | |
| 2007/0087100 A1 * | 4/2007 | Fornaguera | A23G 3/54 426/516 |
| 2011/0146504 A1 * | 6/2011 | Tanabe | A23G 4/043 99/450.6 |

FOREIGN PATENT DOCUMENTS

| | | |
|---|---|---|
| GB | 2311759 A | 10/1997 |
| JP | 3655446 B2 | 6/2005 |
| WO | 2014/127914 A1 | 8/2014 |

\* cited by examiner

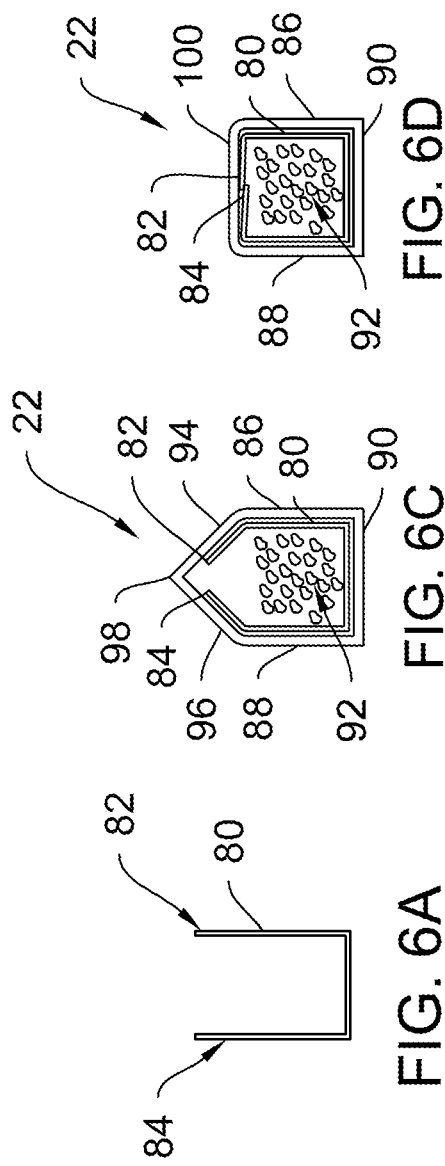

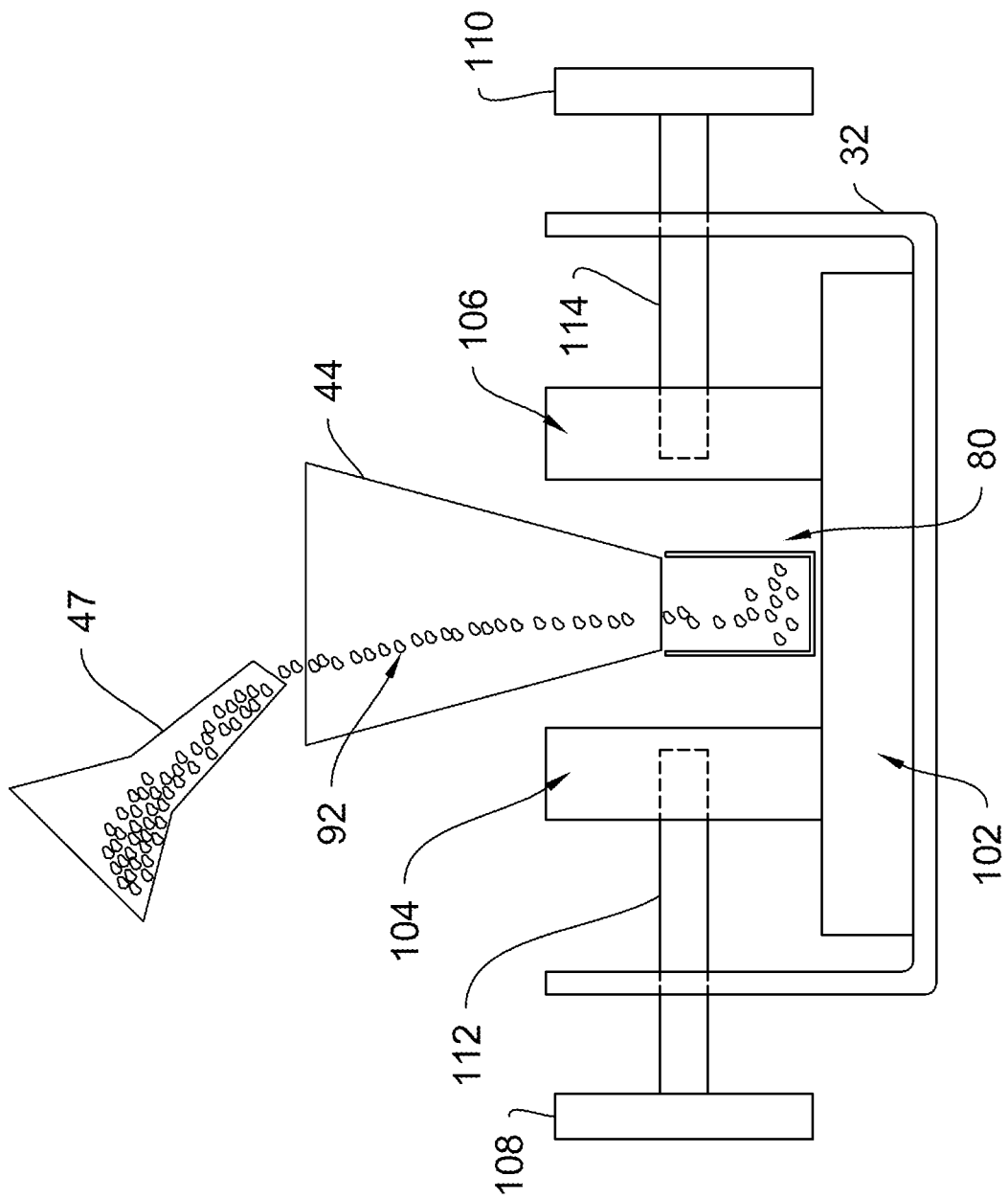

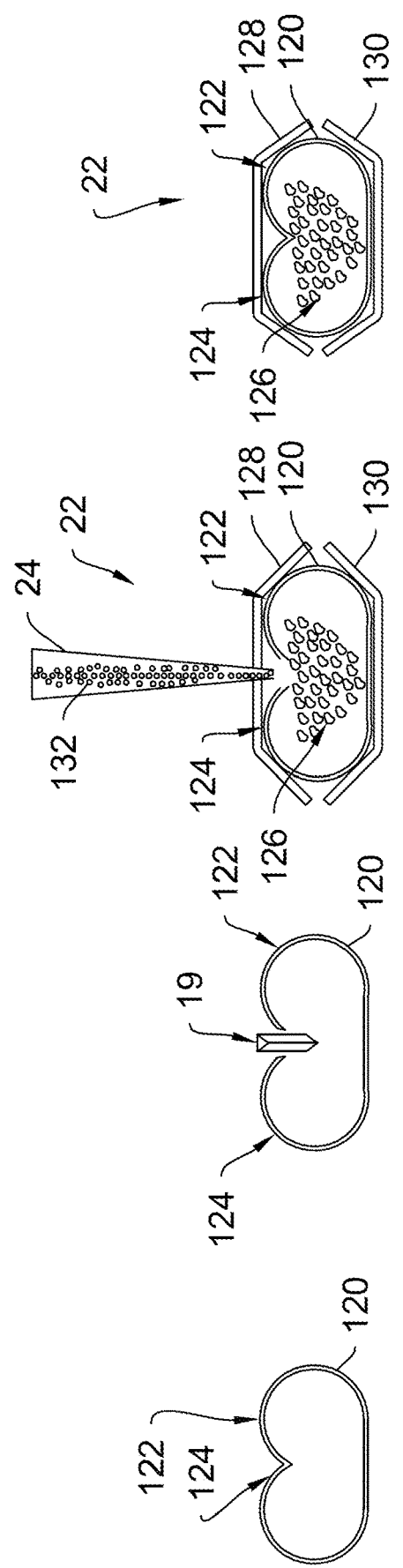

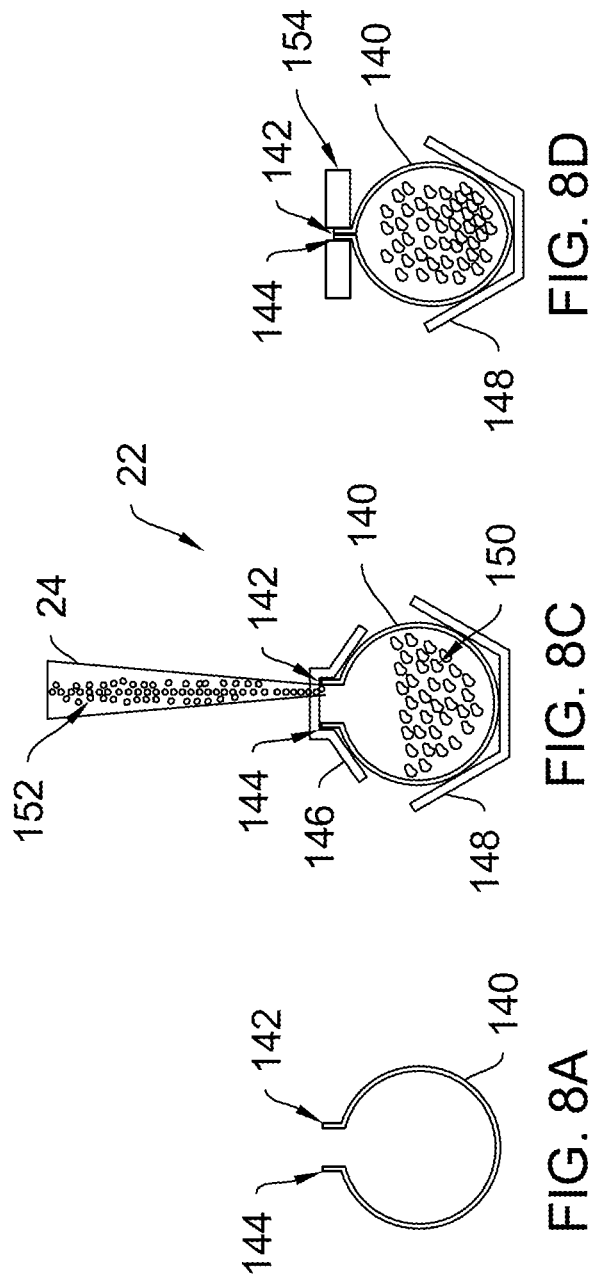

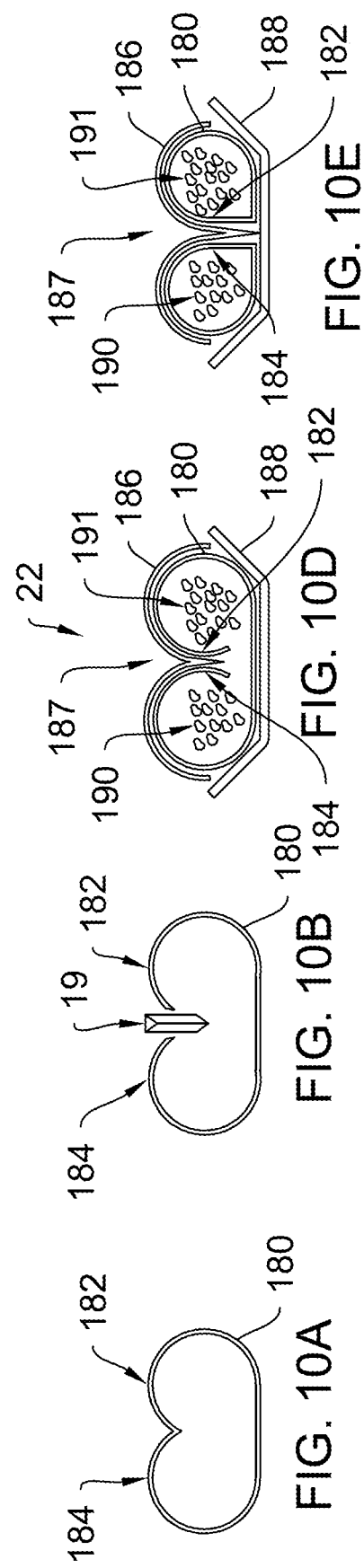

APPARATUS AND METHOD FOR POST-EXTRUSION FILLING AND CLOSURE OF AN EXTRUDATE

BACKGROUND

Technical Field

The present disclosure relates to extrusion and extruded materials, and in particular to an extrusion system having apparatus that produces an extrudate with a filler material inside the extrudate.

Description of the Related Art

Extrusion technology has been used to create a wide variety of products, both edible and non-edible. The ability of an extruder to melt solid materials and then form the material into a variety of shapes and sizes has allowed it to serve a wide variety of markets. One specific area of interest in the extrusion arena has been coextrusion. This has been a hotly contested arena with various patents and claims made by a variety of inventors.

The market has for some time sought for a solution that would open the arena of coextrusion to allow for the inclusion of granular ingredients internal to the shell or product formed by the extruder. With current extrusion technology however, there is a limitation in the orifice size of an extrusion die. This limitation makes it near impossible to coextrude granular or particulate materials through an extrusion die.

The invention that follows resolves the challenges faced with coextruding granular pieces internal to an extruded product.

BRIEF SUMMARY

In at least one aspect, described herein is an apparatus for post-extrusion filling and closing of an extrudate. The apparatus includes a feeder arranged in relation to an extruded rope of material flowing from an extrusion die of an extruder. The rope of material has an opening that can receive a filler material. The feeder is configured to deposit the filler material into the opening of the rope of material as the rope of material flows by the feeder.

A former is arranged to receive the rope of material after the feeder has deposited the filler material into the opening of the rope. The former is configured to shape the rope of material and close a portion or all of the rope around at least a portion of the deposited filler material to retain the filler material within the rope.

In another aspect, described herein is a method for post-extrusion filling and closing of an extrudate. The method includes receiving an extruded rope of material flowing from an extrusion die of an extruder, wherein the rope of material having an opening that can receive a filler material. The method further includes depositing a filler material into the opening of the rope of material, and shaping the rope of material to close a portion or all of the rope of material around the deposited filler material to retain at least a portion of the filler material within the rope.

Additional features of the apparatus and method are described in the detailed description below.

BRIEF DESCRIPTION OF THE SEVERAL VIEWS OF THE DRAWINGS

FIG. 6A-6D pictorially illustrate stages of one example of a post-extrusion filling process in which an extruded rope of material having a U-shaped cross-section is filled and closed.

FIGS. 7A-7E pictorially illustrate stages of another example of a post-extrusion filling process in which an extruded rope of material having a semi-heart shaped cross-section is filled and closed.

FIGS. 8A-8D pictorially illustrate stages of yet another example of a post-extrusion filling process in which an extruded rope of material having a partial circular-shaped cross-section is filled and closed.

FIGS. 10A-10E pictorially illustrate stages of a further example of a post-extrusion filling process in which an extruded rope of material having a semi-heart shaped cross-section is filled from multiple sources of filler material, closed, and cut to form smaller filled ropes of material.

DETAILED DESCRIPTION

Described herein are various embodiments of a filler apparatus that, when implemented with an extruder and a finisher, provides an extrusion process in which an extrudate is filled with additional material after extrusion of the extrudate.

Figure 1:
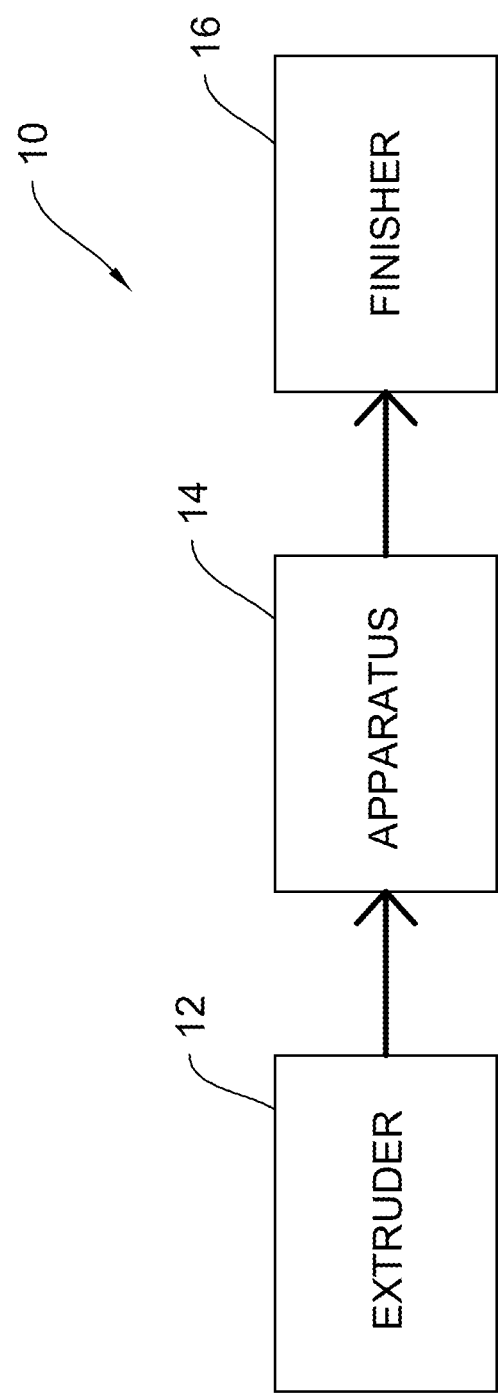
FIG. 1 is a block diagram illustrating one example of an extrusion system that includes filler apparatus for post-extrusion filling of an extrudate in accordance with the present disclosure.

FIG. 1 illustrates an example of an extrusion system 10 that includes apparatus for post-extrusion filling, and possibly closing, of an extrudate. As shown, the extrusion system 10 includes an extruder 12, filler apparatus 14 that receives an extrudate from the extruder 12 for post-extrusion filling of the extrudate, and an optional finisher 16 that receives the filled extrudate and produces a final product for subsequent packaging.

The extruder 12 may include components such as a hopper that receives extrusion material and feeds the extrusion material toward an extrusion die. Within the extruder 12, one or more rotating screws drive the extrusion material with increasing pressure and heat toward the extrusion die. The extrusion die includes an orifice that provides an output from which an extrudate, formed of the extrusion material, can emerge. As will be further understood from the description below, the orifice in the extrusion die may be shaped with a variety of profiles that produce an extrudate having a shape which facilitates post-extrusion filling of the extrudate by the filler apparatus 14. The finisher 16 may include components, as described below, that can press, shape, and/or cut the filled extrudate to produce a finished extruded product. One example of a finished extruded product may be, without limitation, an edible product comprised of individual bite-size pillows of extrudate filled with a filler material. The final product may then be packaged for distribution and sale. The finished extruded product may include, for example, snack food products intended for consumption by humans and/or animals. Another example of a finished extruded product may include a medical or pharmaceutical product in which an extrudate is filled with a therapeutic material for consumption. In yet other implementations, examples of the final extruded product may include other types of food or non-food products (e.g., an extruded plastic, metal, or other structural material) for which post-extrusion filling of the extrudate is suitable and desired. While the block diagram in FIG. 1 includes a finisher 16 that receives and processes the filled extrudate into a final product, the finisher 16 is not necessary. Other implementations of the extrusion system 10 may include only the extruder 12 and the filler apparatus 14.

Figure 2:
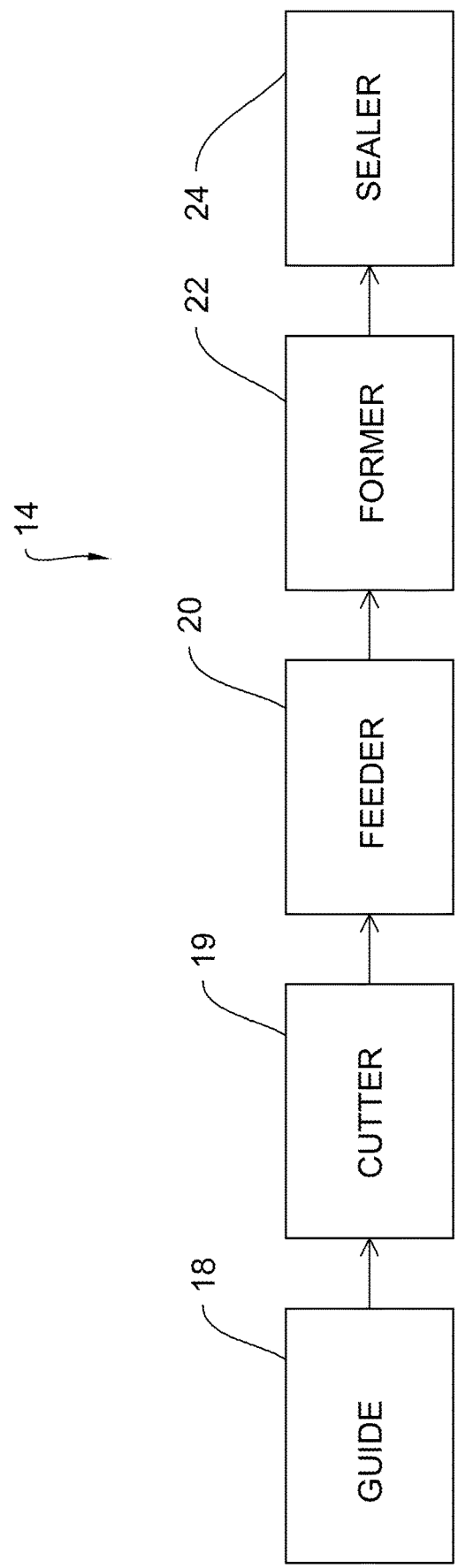
FIG. 2 is a block diagram illustrating components of the filler apparatus shown in FIG. 1.

FIG. 2 illustrates components of one example of a filler apparatus 14 as shown in FIG. 1. In various embodiments, the filler apparatus 14 includes a feeder 20 and a former 22. In various embodiments, the filler apparatus 14 also optionally includes a guide 18, a cutter 19, and/or a sealer 24.

In embodiments that have a guide 18, the guide may include a variety of components as described below, that are configured to guide an extrudate that flows from an extrusion die of an extruder, such as the extruder 12 in FIG. 1. In context of the present disclosure, the extrudate is generally a rope-shaped extruded material that flows from the extrusion die of the extruder. The extruded material may take any shape as it flows from the extruder. For example, the extruded material emerging from the extrusion die may be flat, and components of the guide 18 may be configured to support and possibly shape the flat extruded material into a suitable form that can receive filler material from the feeder 20. In some cases, the flat extruded material may first have filler material deposited thereon and thereafter be shaped, possibly for closure, by the former 22. In any event, the guide 18 has a receiving end that is configured to receive the extruded material flowing from the extrusion die of the extruder 12. Whether the rope of extruded material flowing from the extrusion die is already shaped for filling with filler material, e.g., as a hollow extruded rope of material, or whether the rope of extruded material is shaped post-extrusion for filing is not essential to the present disclosure. For purposes of the present disclosure, it is considered that the extruded material flowing from the extrusion die of the extruder 12 has a rope-like form, whether the rope has a flat, curved, or even a hollow extruded form.

In embodiments that have a guide 18, the guide is arranged to direct the flow of the extruded material toward the feeder 20. For simplicity and for purposes of illustration, the remainder of the description herein assumes the extruded material has a hollow rope-shaped form, or is shaped to have a hollow rope-shaped form, as the extruded material flows from the extruder toward the former.

The rope of extruded material has an opening through which an interior of the rope can receive a filler material, e.g., as described below. In some embodiments, the opening is defined in the rope of material by virtue of the shape of the extrusion die orifice from which the extruded material flows. In other embodiments, a cutter 19 may be arranged to cut the rope of extruded material after extrusion to form the opening in the rope.

The rope of material flowing from the extruder 12 flows by the feeder 20. The feeder 20 is configured to deposit filler material into the opening of the rope of material. Further details regarding the feeder 20, including components that may form various embodiments of the feeder 20, are described further below.

Downstream of the feeder 20 is the former 22. The former 22 is arranged to receive the rope of material after the feeder 20 has deposited the filler material into the opening of the rope. Briefly stated, embodiments of the former 22 are configured to shape the rope of material, and in some cases close a portion or all of the rope of material, around at least a portion the deposited filler material to retain the filler material within the rope. The filler apparatus 14 may further include a sealer 24 that acts, possibly in cooperation with the former 22, to apply a sealing agent to one or more sides of the opening in the rope of material. The sealing agent facilitates sealing of the rope of material as the material is closed by the former 22 around the deposited filler material.

Figure 3:
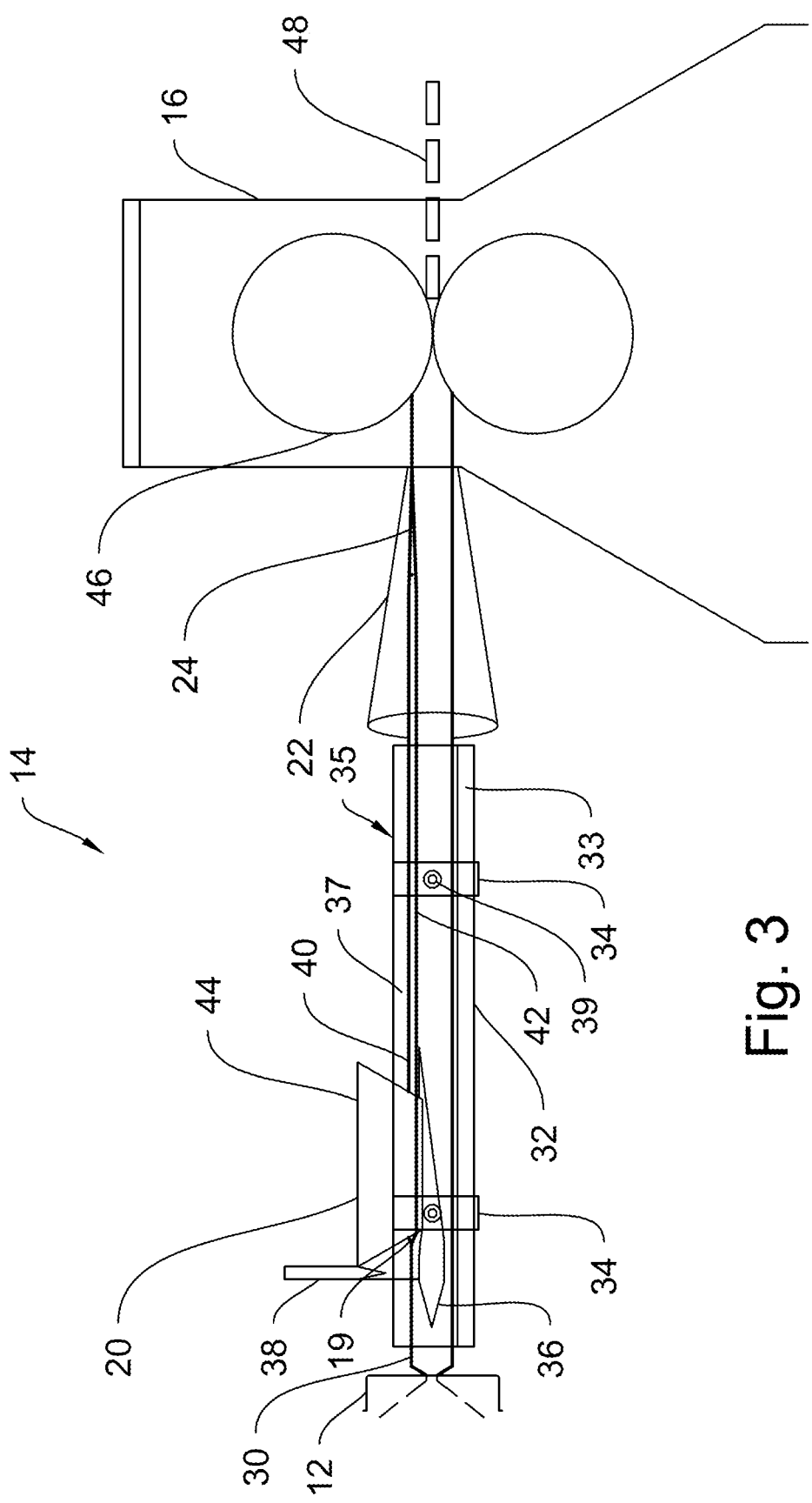
FIG. 3 is a pictorial diagram illustrating an embodiment of the extrusion system of FIG. 1, including an extruder, a filler apparatus for post-extrusion filling of an extrudate, and a finisher for providing a finished extruded product.

FIG. 3 illustrates an embodiment of the extrusion system 10 of FIG. 1, which includes the extruder 12, the filler apparatus 14 for post-extrusion filling of an extrudate, and the finisher 16 for providing a finished extruded product. As represented by broken lines in FIG. 3, extrusion material within the extruder 12 is driven toward an orifice in the extrusion die of the extruder 12. Emerging from the extrusion die orifice is an extrudate that, in the context of the present disclosure, is an extruded rope of material 30. Because of the heat and pressure imparted on the extrusion material within the extruder 12, the extrusion material becomes a pliable dough-like material that the extrusion die forms into a continuous rope that can be shaped, formed, and/or cut after extrusion. Depending on the composition of the extrusion material and the structure and conditions in the extruder 12, the extrudate flowing from the extrusion die may expand as it emerges.

In the embodiment illustrated in FIG. 3, the filler apparatus 14 includes a guide having at least one component in the form of a supporting trough 32 that receives the rope of material 30 as the rope 30 flows from the extrusion die of the extruder 12. The supporting trough 32 supports the rope of material 30 as the rope flows by the feeder 20 toward the former 22. In FIG. 3, the supporting trough 32 and connecting brackets are shown transparent so as to allow the rope of material 30 to be seen from the outside the trough 32 as the rope flows through the trough toward the former 22. The former 22 is also shown transparent so as to allow the rope of material 30 to be seen inside the former 22 as the rope flows through the former 22 into the finisher 16. In typical implementations however, the supporting trough 32 and/or the former 22 are constructed of opaque materials that do not allow the rope of material to be seen from the side. The rope of material 30 may be viewed from above in instances where the supporting trough 32 has an upper side that is open.

The supporting trough 32, in this embodiment, includes a supporting floor 33 and opposing side walls 35, 37 that direct the flow of the rope of material 30 toward the former 22. One or more brackets 34 may be used to secure the floor 33 to the opposing side walls 35, 37, to form the supporting trough 32. Because the rope of material 30 flows through the supporting trough 32 on the supporting floor 33 between the opposing side walls 35, 37, it is preferable that the floor 33 and/or opposing side walls 35, 37 are made of a low-friction material that facilitates sliding movement of the rope of material 30 through the supporting trough 32. It is also preferable, though not required, that the brackets 24 be adjustable so as to provide the supporting trough 32 with an adjustable width between the side walls 35, 37. In embodiments where adjustable brackets 24 are employed, the brackets may include, for example, threaded components 39 that allow the opposing side walls 35, 37 to adjustably move toward or away from each other and provide an adjustable width to the supporting trough 32.

Alternatively or in addition to the supporting trough 32, the filler apparatus 14 shown in FIG. 3 includes a guide having a component in the form of a tapered body 36. In the illustrated implementation, the tapered body 36 is held in place by a supporting bracket 38 and is arranged such that the tapered body 36, or at least a portion thereof, is positioned within the interior of the rope of material 30 as the rope of material flows toward the former 22. For purposes of illustration in FIG. 3, the rope of material 30 in this section is shown transparent so as to allow the tapered body 36 to be seen. Where the extrudate forming the rope of material 30 is normally opaque, the tapered body 36 or the portion thereof within the interior of the rope is normally not visible outside of the rope of material.

The tapered body 36 in this embodiment has a receiving end comprised of a wedge-shaped or cone-shaped leading edge that causes an opening in the rope of material 30 to open or widen as the rope of material 30 flows past the leading edge of the tapered body 36. The tapered body 36 may also include a portion having a cross-section that is sized to expand the rope of material 30 so as to open or widen the opening in the rope of material 30. In embodiments where the filler apparatus 14 includes a guide comprised of both the supporting trough 32 and the tapered body 36, the tapered body 36 may be positioned within the supporting trough 32 and held in place by the supporting bracket 38. The supporting bracket 38 may in turn be held in place by an appropriate connection to one or both of the side walls 35, 37 of the supporting trough 32 and/or the feeder 20 or other structure of the filler apparatus 14.

Figure 5A:
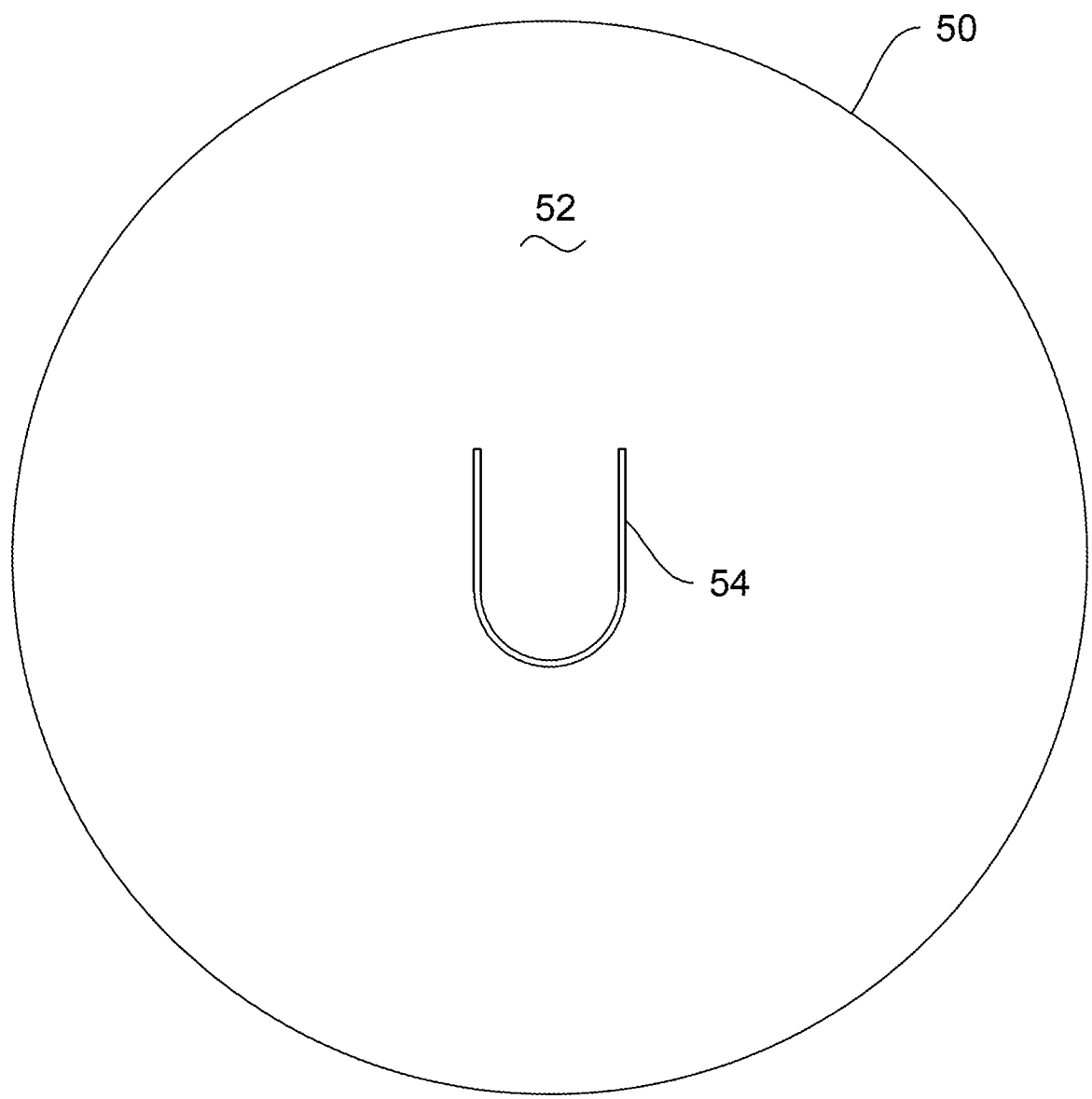
FIGS. 5A-5E illustrate examples of an extrusion die having an orifice through which extrusion material in the extruder exits the extrusion die.

As will be described below, e.g., in regard to FIGS. 5A, 5B, and 5D, the extrusion die producing the extruded rope of material 30 may form the rope 30 such that the rope 30 already has the opening through which filler material is deposited into the interior of the rope. In other implementations, e.g., as discussed below in regard to FIGS. 5C and 5E, the extrusion die may have a profile that produces an extruded rope of material 30 without such an opening. In such implementations, the filler apparatus 14 may include a cutter 19 that has a cutting edge positioned with respect to the rope 30 to axially cut the rope as it flows from the extrusion die. The cut in the rope of material 30 is then used to form the opening through which the filler material is deposited into the interior of the rope. In some implementations, the cutter 19 may be formed of a razor or knife having a blade that is suitable for cutting the extruded rope of material 30. In other implementations, a high-energy ablative mechanism such as a laser, or a high-pressure water jet or air jet, may be used to cut the rope of material 30 and form the opening in the rope.

In FIG. 3, the opening is shown having edges 40 and 42.

Positioned adjacent to and/or between the edges 40 and 42 of the opening is the feeder 20. In the illustrated embodiment, the feeder 20 includes a hopper 44 that receives filler material to be deposited into the rope of material 30. The hopper 44 is arranged and positioned to guide a flow of filler material into the opening of the rope 30. In various embodiments, the filler material may be a granular or chopped material, a paste, a gel, or a foam material for example, or a combination thereof. For example, if the extrusion system 10 is producing a food product, filler material comprised of granular or chopped ingredients may include, without limitation, chopped nuts, grains, dried or fresh vegetables, fruit, etc. Filler material comprised of a paste or gel may include, without limitation, jellies or jams made of fruit or vegetables, nut butters, or dried materials mixed with a viscous binder, etc. Likewise, foam materials may include without limitation vegetable or fruit products pressed into a slurry and mixed with other materials that produce a foam composition. The aforementioned filler materials are exemplary only and do not preclude use of the filler apparatus 14 to provide post-extrusion filling of any type of filler material into the rope 30, whether the filler material is a food or non-food material. In other implementations where the extrusion system 10 is producing a non-food product, the filler material may comprise any type or form of material that can be deposited into the interior of the rope of material 30.

In various embodiments, the feeder 20 may be configured to deposit the filler material into the opening of the rope 30 by a gravity feed of the filler material, e.g., using the hopper 44 illustrated in FIG. 3 and other figures. In other implementations, the feeder 20 may be configured to deposit the filler material into the opening of the rope 30 by a pressurized injection of the filler material, e.g. as will be described with respect to filler tube 210 shown in FIG. 11. As will be appreciated from the implementation shown in FIG. 11, pressurized injection of filler material may be provided in combination with a gravity feed of filler material, or it may be provided alternatively to a gravity feed of filler material.

In various embodiments, the feeder 20 may be configured to deposit multiple, different filler materials into the opening of the rope 30. Examples of such embodiments are described below with regard to FIGS. 10A-10E and FIG. 11. The different filler materials may be multiple, different granular or chopped materials, or different paste, gel, or foam materials for example, or any combination thereof. In various embodiments, the feeder 20 may have multiple outputs, wherein each output of the feeder 20 is configured to deposit a different filler material into the opening of the rope of material 30 as the rope flows by the feeder 20. The different filler materials may be simultaneously deposited into the interior of the rope 30, or may be deposited into the rope 30 in a sequential fashion, or both where some materials are deposited simultaneously and other materials are deposited sequentially. Additionally, the different filler materials may be deposited such that the different materials remain physically separate from each other within the interior of the rope of material 30, or the different materials may mix with one another when being deposited in the rope 30 or afterward.

The former 22, as illustrated for example in FIG. 3 and other figures herein, is arranged to receive the rope of material 30 after the feeder 20 has deposited filler material into the opening of the rope 30. The former 22 is configured to shape the rope of material 30 such that a portion or all of the rope 30 closes around the deposited filler material as the rope 30 flows through the former 22. The closed rope 30 retains the filler material in the interior of the rope 30. In some embodiments, the rope 30 may not fully close around the deposited filler material, but instead the former 22 may shape the rope 30 so as to narrow the opening through which the filler material was deposited into the rope 30 and close the rope around at least a portion of the deposited filler material, and thus retain the filler material within the rope.

An example of a former 22 is illustrated by a cone-shaped structure in FIG. 3. The cone-shaped structure 22 has a tapered passage with one or more interior sidewalls, preferably of decreasing inside dimension, such that the one or more sidewalls bear upon the outer surface of the extruded rope 30 and cause a reduction in the diameter or other cross-sectional dimension of the extruded rope 30. As a result of the reduced dimension of the extruded rope 30, the edges 40, 42 of the opening in the rope of material 30 are brought together and may overlap one another as the rope 30 passes through the tapered passage of the cone-shaped structure 22. Preferably, the reduced dimension of the former 22 induces a pressure on the edges 40, 42 of the opening that causes the material of the rope 30 at the edges 40, 42 to close upon one another and possibly bind together to form a fully closed rope of material 30, though binding of the material at the edges 40, 42, is not required. In this manner, the tapered passage of the former 22 causes a portion or all of the rope of material 30 to partially or wholly close around the deposited filler material as the rope of material 30 flows through the tapered passage.

In some embodiments, e.g., as illustrated in FIGS. 10D and 10E, the one or more interior sidewalls of the tapered passage of the former 22 may cause opposing sides of the rope of material 30 to close upon itself around at least a portion of the deposited filler material and form separable smaller ropes of material containing the deposited filler material. In such embodiments, the feeder 20 may be configured to deposit different filler materials adjacent the opposing sides of the rope of material 30 such that the separable smaller ropes of material, when formed (see, e.g., FIG. 10D), contain different deposited filler material. In such embodiments, the finisher 16 may be arranged to cut the rope of material 30 to separate the smaller ropes of material. In some cases, the finisher 16 may cooperate with the former 22 such that a sharp edge in a portion of the former 22 may cut the rope of material 30 to separate the smaller ropes of material. See, e.g., FIG. 10E. The separated smaller ropes of material may thereafter be separately processed by the finisher 16.

As described earlier with regard to FIG. 1, the filler apparatus 14 may further include a sealer 24 that facilitates a sealing of the rope of material 30 around the filler material that has been deposited into the interior of the rope of material. In some embodiments, the sealer 24 may apply a sealing agent to one or more edges 40, 42 of the opening in the rope of material 30 prior to or concurrently with the edges 40, 42 being brought together within the former 22. The sealer 24 may include, for example, one or more brushes or pressurized ports that apply or spray a liquid, such as water or a solution such as a paste, as a sealing agent to the edges 40, 42. The applied sealing agent improves the ability of the material at an edge 40, 42 to bind with the material at the opposing edge 40, 42 or with other material of the rope 30 and thereby produce a closed rope around the deposited filler material.

After the rope of material 30 has passed through the former 22 and been shaped into one or more wholly or partially closed ropes, the one or more ropes 30 are provided to the finisher 16. As described earlier, the finisher 16 may press, shape, and/or cut the filled rope to produce a final extruded product, for example (without limitation) individual bite-size extruded pillows filled with a filler material.

FIG. 3 illustrates the finisher 16 as including multiple rollers 46 through which the rope 30 passes. In this embodiment, the rollers 46 have a surface that is configured to press, shape, and/or cut the rope 30 into individual portions 48 that can thereafter be packaged for distribution and sale.

Figure 4:
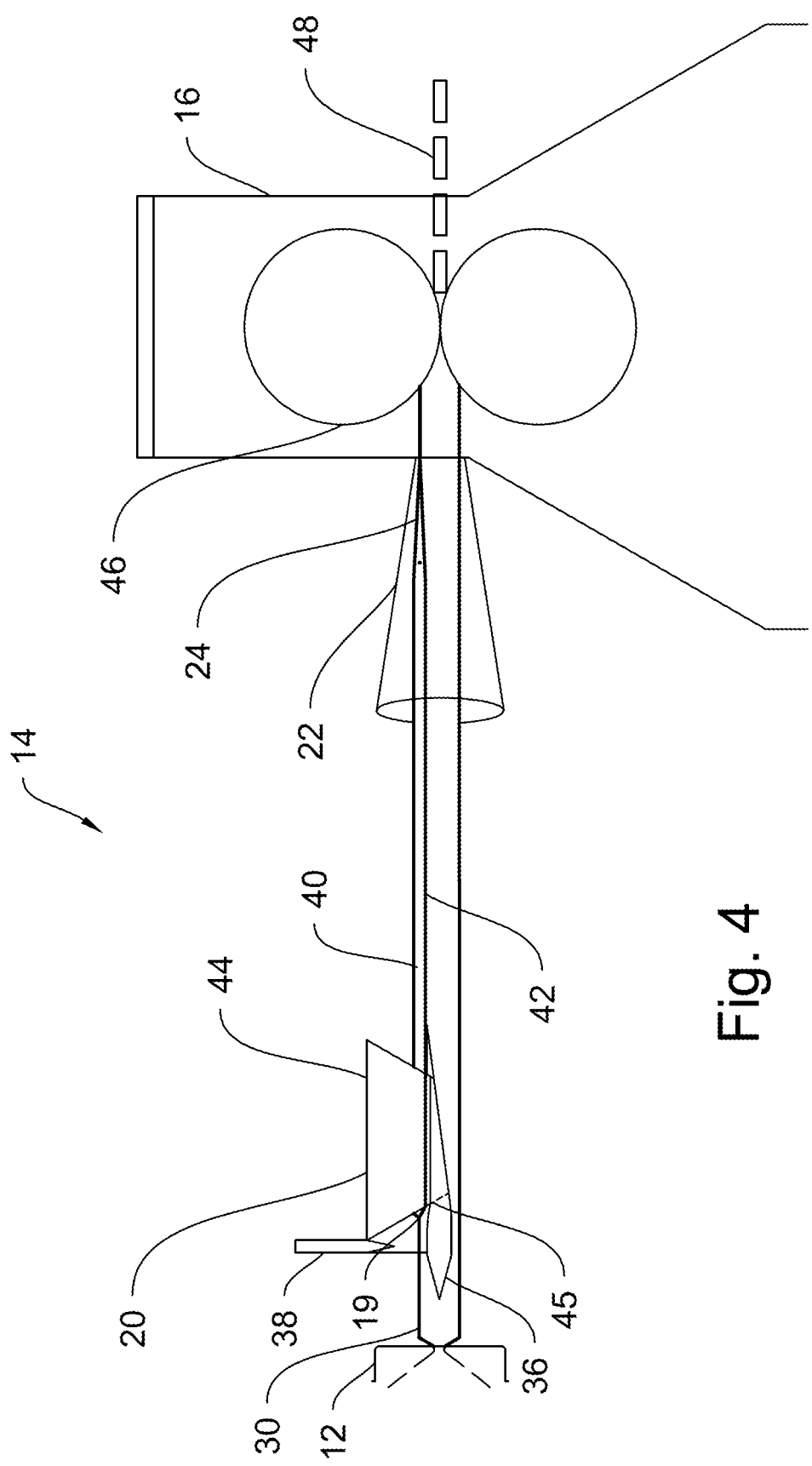
FIG. 4 is a pictorial diagram illustrating another embodiment of the extrusion system of FIG. 1, including an extruder, a filler apparatus for post-extrusion filling of an extrudate, and a finisher for providing a finished extruded product.

FIG. 4 illustrates another embodiment of an extrusion system with a filler apparatus 14 that is usable for post-extrusion filling of an extrudate. Features in FIG. 4 that are similar or identical to features shown in FIG. 3 are indicated by like reference numbers. The filler apparatus 14 shown in FIG. 4 does not include a guide having a component in the form of a supporting trough 32 as shown in FIG. 3. Rather, with the embodiment shown in FIG. 4, sustained tension in the rope of material 30 between the extruder 12 and the finisher 16 is sufficient to maintain the flow of the rope of material 30 toward the finisher 16 without a supporting trough 32. In this regard, in at least some embodiments, the finisher 16 may be configured to exert a pulling tension on the rope of material 30 flowing from the extrusion die by the feeder 20 to be shaped and closed around at least a portion of the deposited filler material by the former 22 without a support positioned beneath the rope of material 30. For example, the rollers 46 in the finisher 16 may draw the rope of material 30 at a speed that matches or slightly exceeds the speed at which the rope of material 30 emerges from the extrusion die so that sufficient tension in the rope material 30 is sustained.

In various embodiments, for example in FIG. 4 where the filler apparatus 14 includes a guide in the form of a tapered body 36, the guide (i.e., the tapered body 36) may include a passage defined therethrough that is arranged to receive filler material from the feeder 20. The passage in the tapered body 36 directs the filler material into the opening in the rope of material 30 into the interior of the rope. In FIG. 4 for example, the tapered body 36 may include an aperture 45 defined therethrough that is positioned adjacent to or aligned with an output of the feeder 20, e.g., at the bottom of the hopper 44. As filler material passes through the hopper 44, the filler material flows from the hopper 44 through the aperture 45 in the tapered body 36 into the opening of the rope 30. The other structures of the filler apparatus 14 shown in FIG. 4 are preferably configured as described above with regard to FIG. 3. In yet other embodiments that do not include a tapered body 36 as described above, the hopper 44 is arranged to receive filler material and direct the filler material into the opening of the rope 30.

The extrusion die of the extruder 12 may be configured with orifices having a variety of profiles that produce an extruded rope of material 30 having a desired shape for post-extrusion filling of the rope of material 30. FIGS. 5A-5E illustrate exemplary embodiments of extrusion dies that may be used with the filler apparatus 14 described herein. FIG. 5A illustrates one example of an extrusion die 50 having a front face 52 that faces toward the filler apparatus 14 shown in FIGS. 3 and 4. The front face 52 of the extrusion die 50 has a curved U-shaped orifice 54 through which extrusion material in the extruder 12 exits the extrusion die 50. As the extrudate emerges from the extrusion die 50, the extrusion die 50 forms a rope of material 30 having corresponding curved U-shaped cross-section. Having a U-shaped cross-section, the rope of material 30 provides an opening through which the feeder 20 can deposit filler material into the interior of the rope 30 as the rope flows by the feeder 20.

Figure 5B:
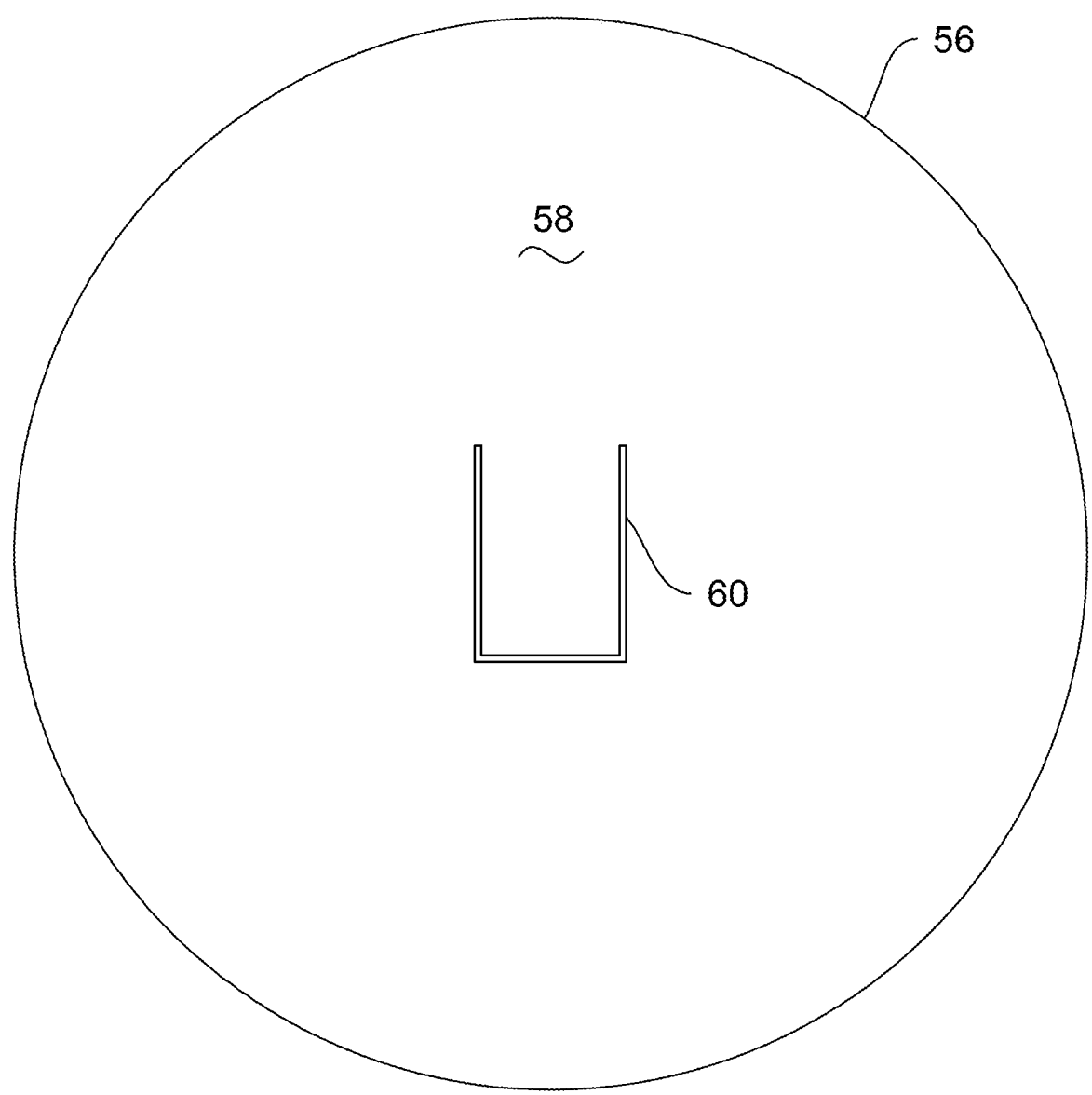

FIG. 5B illustrates another example of an extrusion die 56 having a front face 58 with an alternative U-shaped orifice 60 through which extrusion material in the extruder 12 exits the extrusion die 56. In contrast to the curved U-shaped orifice 54 shown in FIG. 5A, the U-shaped orifice 60 in FIG. 5B has angled corners. In FIG. 5B, the angled corners appear as square corners, though with other embodiments, the corners are not necessarily square. Similar however to the U-shaped orifice 54 shown in FIG. 5A, the U-shaped orifice 60 in FIG. 5B forms a rope of material 30 having a corresponding U-shaped cross-section with an opening at the top of the rope through which the feeder 20 can deposit filler material into the interior of the rope 30 as the rope flows by the feeder 20.

Figure 5C:
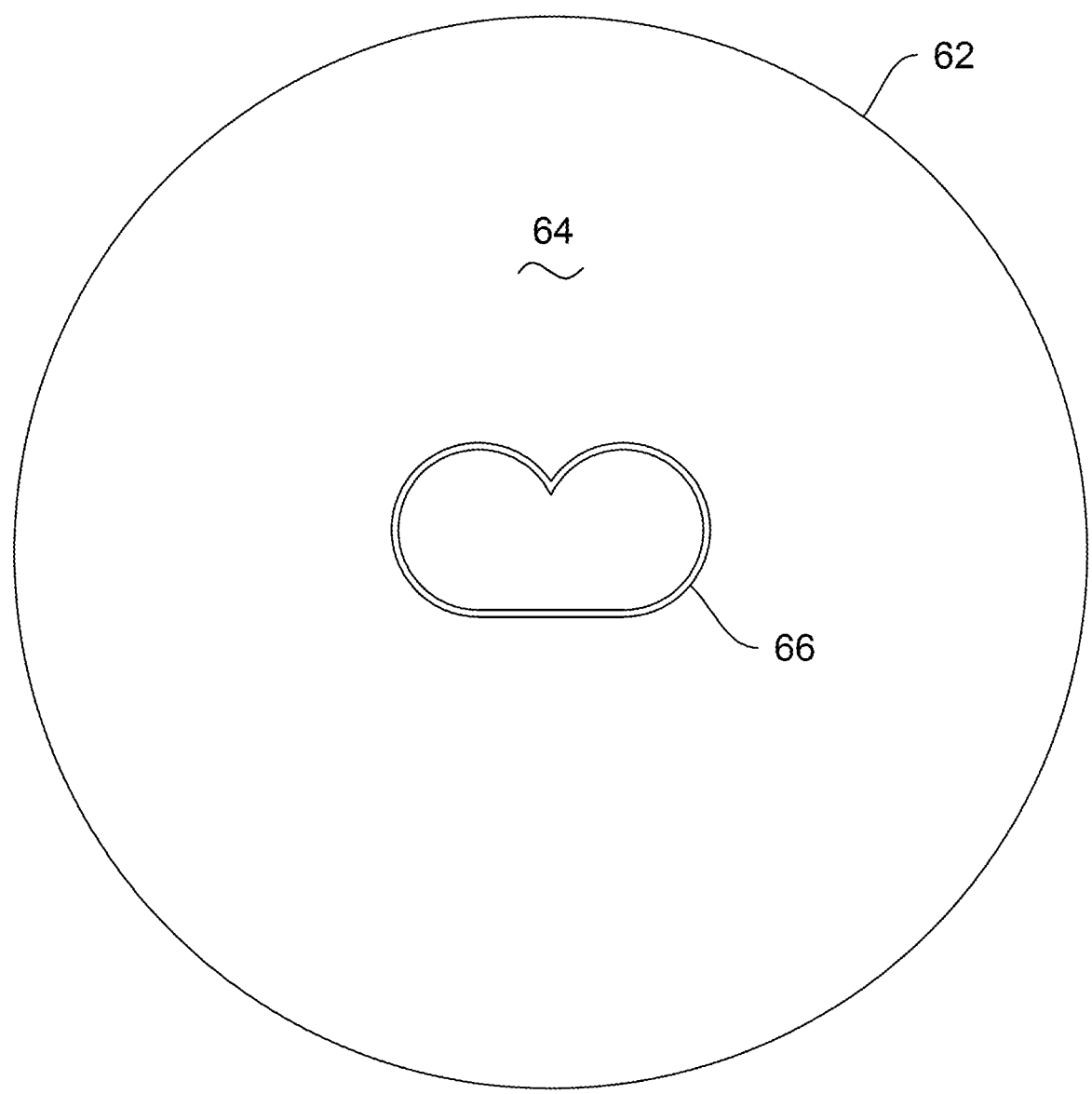

FIG. 5C illustrates yet another example of an extrusion die 62 having a front face 64 with a semi-heart shaped orifice 66 through which extrusion material in the extruder 12 exits the extrusion die 62. As the extrudate emerges from the extrusion die 62, the semi-heart shaped orifice 66 forms a rope of material 30 having a corresponding semi-heart shaped cross-section. As will be described in greater detail with regard to FIGS. 7A-7E, the filler apparatus 14 may include a cutter 19 that cuts the rope of material 30, e.g., along the upper cleft of the heart shape, to form an opening in the rope of material 30 through which filler material may be deposited by the feeder 20 as the rope of material flows by the feeder 20.

Figure 5D:
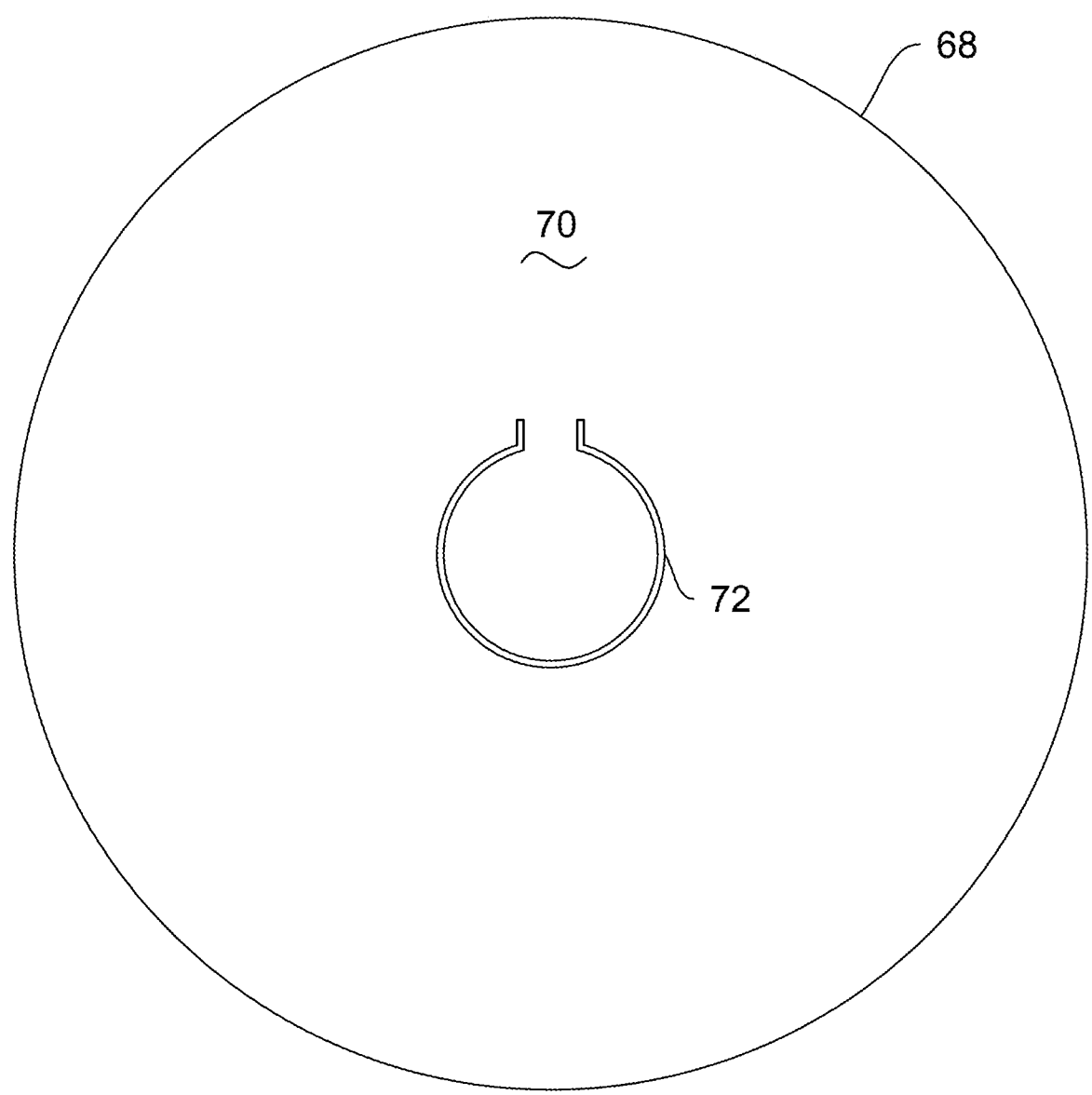

FIG. 5D illustrate still another example of an extrusion die 68 having a front face 70 with a partial circular-shaped orifice 72 through which extrusion material in the extruder 12 exits the extrusion die 68. As the extrudate emerges from the extrusion die 68, the partial circular-shaped orifice 72 forms a rope of material 30 having a corresponding partial circular-shaped cross-section. In this illustrated example, the orifice 72 has upward extending edges at the top of the partial circle that provide the extruded rope 30 with an opening through which filler material may be deposited by the feeder 20 as the rope of material flows by the feeder 20. In other embodiments, the partial circular-shaped orifice 72 may not have upwardly-extending edges but instead simply leave a top portion of the circle open to provide the extruded rope of material 30 with a corresponding opening at the top of the rope 30.

Figure 5E:
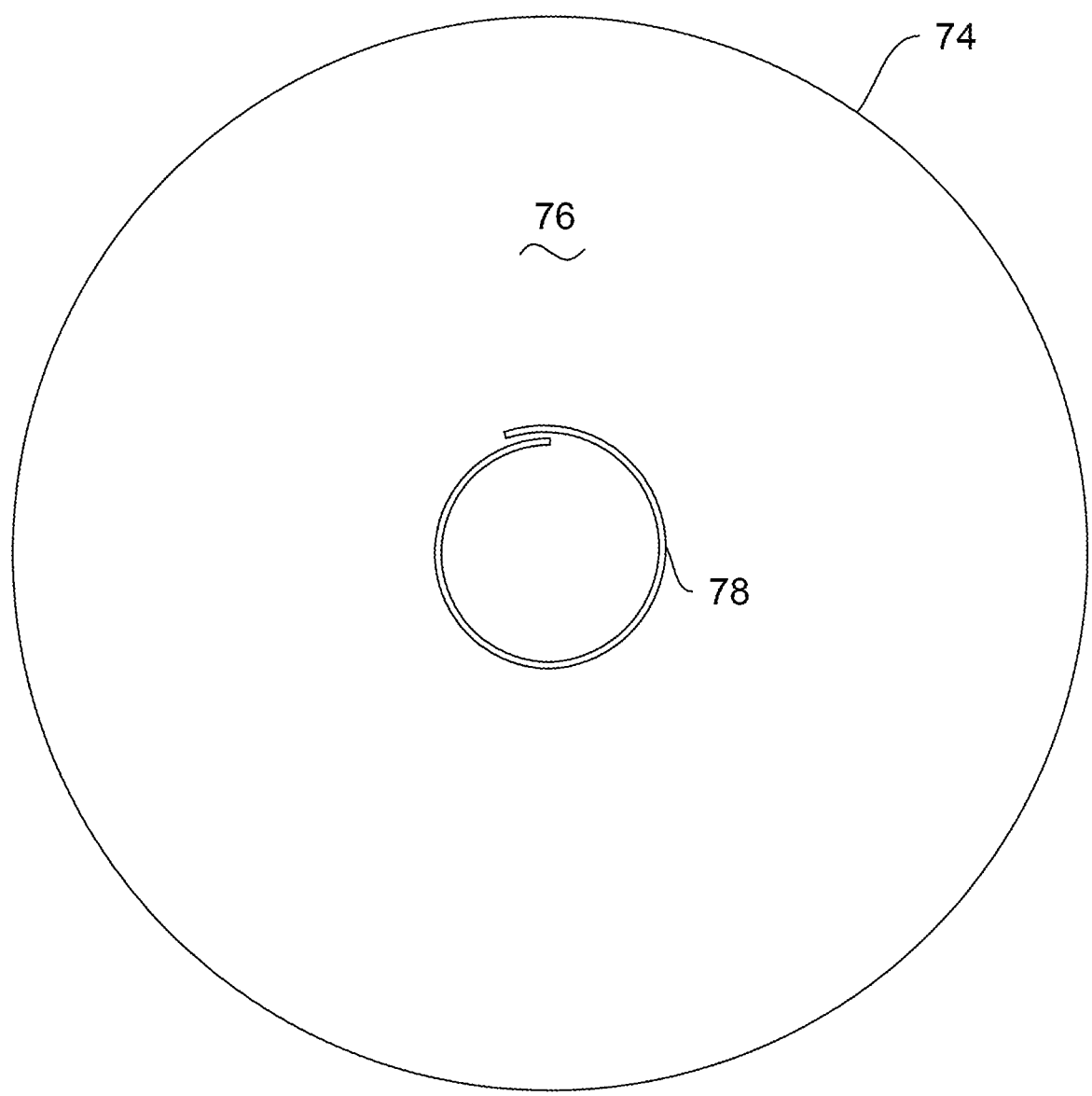

FIG. 5E illustrates a further example of an extrusion die 74 having a front face 76 with an overlapping circular-shaped orifice 78 through which extrusion material in the extruder 12 exits the extrusion die 74. As the extrudate emerges from the extrusion die 74, the overlapping circular-shaped orifice 78 forms a rope of material 30 having a corresponding overlapping circular-shaped cross-section. As will be described in greater detail with regard to FIGS. 9A-9E, a guide within the filler apparatus 14 may have a wedge-shaped or cone-shaped leading edge (e.g., a tapered body 36 as shown in FIG. 3) that causes the overlapping portions of the rope of material 30 to separate, thus providing an opening in the rope 30 through which the feeder 20 may deposit filler material into the interior of the rope 30. Subsequent to filler material being deposited into the rope 30, the former 22 may have interior sidewalls with a decreasing inner dimension, as described earlier, that cause the upper portions of the rope of material to close upon each other and possibly again overlap for closing and optionally sealing the rope of material around the deposited filler material.

FIGS. 6A-6D illustrate stages of one example of a post-extrusion filling process in which an extruded rope of material having a U-shaped cross-section is filled and closed. In FIGS. 6A-6D, a former 22 is shown configured to receive and close an extruded rope of material 80 having a U-shaped cross-section. Referring to FIG. 6A, the U-shaped rope 80 has upper edges 82, 84, e.g., as formed by the extrusion die 56 shown in FIG. 5B.

FIG. 6B illustrates an axial view of the filler apparatus 14 as viewed from the front face of the extrusion die 56 that forms the rope of material 80. In this embodiment, the filler apparatus 14 includes a guide having a component in the form of a supporting trough 32 that supports the rope of material 80 as it flows from the extrusion die toward and past the hopper 44 of the feeder 20. The supporting trough 32 in this embodiment includes a floor 102 on which the rope 80 flows. The trough 32 is bounded by opposing side walls 104, 106 and directs the flow of the rope of material 80 through the filler apparatus 14 toward a former, such as former 22 as previously described. Handle portions 108, 110 coupled to threaded portions 112, 114 are used to adjustably position the side walls 104, 106 with respect to the supporting floor 102 to provide a guiding channel having a variable and adjustable width. As the rope of material 80 flows by the hopper 44, the upper edges of the rope 80 are aligned with and/or adjacent to the outlet of the hopper 44 so that filler material 92, fed from a filler source 47 into the hopper 44, is guided by the hopper 44 into the interior of the rope 80.

Subsequent to the filler material 92 being deposited into the interior of the rope 80, the rope 80 flows into a former 22 that has a bottom 90 and opposing sidewalls 86, 88 as shown in FIG. 6C. In some embodiments, the cross-section of the former 22 may approximately match the cross-section of the rope 80, at least initially. As the rope 80 continues to flow through the former 22, upper edges 94, 96 of the opposing sidewalls 86, 88 may converge to form a peak 98. The converging upper edges 94, 96 cause the upper edges 82, 84 of the rope 80 to bend and similarly converge toward one another. In this embodiment, the upper edges 94, 96 fully converge as shown in FIG. 6D to form a flat upper surface 100, thus eliminating the peak 98. The fully converging upper edges 94, 96 thus cause the upper edges 82, 84 of the rope 80 to meet and possibly overlap, as illustrated in FIG. 6D, resulting in a closed rope 80 that retains the filler material 92 inside the rope.

Figure 7C:
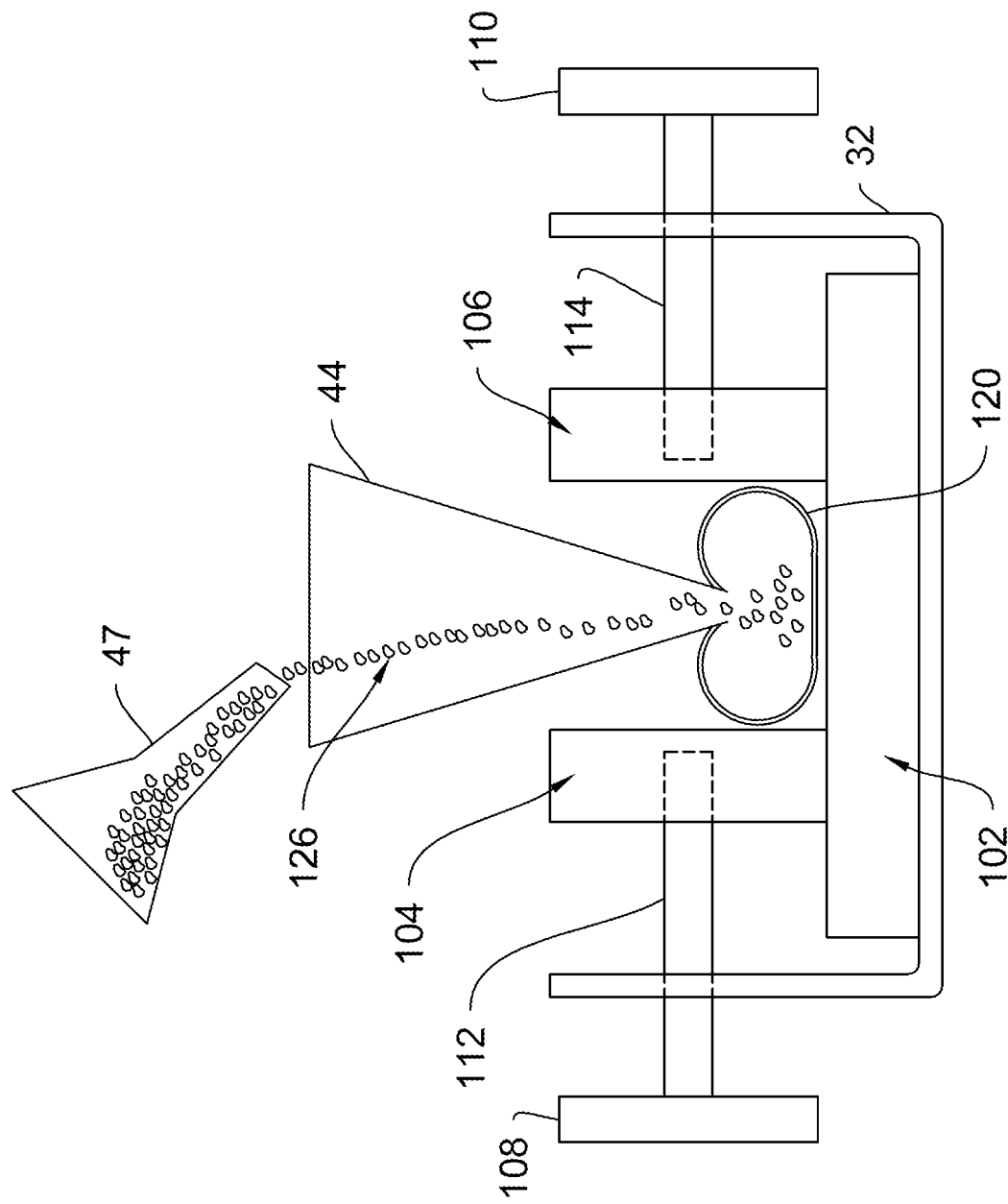

FIGS. 7A-7E illustrate stages of another example of a post-extrusion filling process in which an extruded rope of material having a semi-heart shaped cross-section is filled and closed. In FIGS. 7A-7E, a former 22 is shown configured to receive and close an extruded rope of material 120 having a semi-heart shaped cross-section. Referring to FIG. 7A, the semi-heart shaped rope 120 has upper curved clefts 122, 124, e.g., as formed by the extrusion die 62 shown in FIG. 5C. In this embodiment, the filler apparatus 14 includes a cutter 19 with a cutting edge arranged to axially cut the rope of material 120 as the rope 120 flows from the extrusion die 62. The cutter 19 may be arranged to cut the rope of material 120 between the clefts 122, 124 as the rope 120 flows from the extrusion die 62 to the receiving end of a supporting trough 32 as shown in FIG. 7C.

FIG. 7C illustrates an axial view of the filler apparatus 14 as viewed from the front face of the extrusion die 62 that forms the rope of material 120. In this embodiment, the supporting trough 32 supports the rope of material 120 as it flows from the extrusion die toward and past the hopper 44. The rope 120 flows on the floor 102 between the opposing side walls 104, 106. Handle portions 108, 110 coupled to threaded portions 112, 114 adjustably position the side walls 104, 106 with respect to the supporting trough 32 to provide a guiding channel having a variable and adjustable width. As the rope of material 120 flows by the hopper 44, the cut and separated upper clefts 122, 124 of the rope 120 are aligned with and/or adjacent to the outlet of the hopper 44 so that filler material 126, fed from a filler source 47 into the hopper 44, is guided by the hopper 44 into the interior of the rope 120.

Subsequent to the filler material 126 being deposited into the interior of the rope 120, the rope 120 flows through a former 22 having a lower sidewall 130 and an upper sidewall 128 sized and positioned to receive the rope of material 120, as shown in FIG. 7D. As the rope 120 flows through the former 22, the lower and upper sidewalls 128, 130 converge inward and constrict the space through which the rope 120 flows. This causes the upper clefts 122, 124 to converge toward one another. In this embodiment, the converging upper clefts 122, 124 meet as illustrated in FIG. 7E, thus providing a closed rope 120 that retains the filler material 126 inside the rope. In other embodiments, the converging upper clefts 122, 124 may not necessarily meet, but have a narrowed gap between the clefts 122, 124 that retains the filler material 126 inside the rope.

Returning to FIG. 7D, the filler apparatus 14 may further include a sealer 24 that facilitates a sealing of the rope of material 120 around the filler material 126, though inclusion of a sealer 24 is optional. In this embodiment, the sealer 24 applies a sealing agent 132 to an inner edge of one or both upper clefts 122, 124 of the rope of material 120 prior to or concurrently with the edges of the clefts 122, 124 being brought together, as illustrated in FIG. 7E. The sealing agent 132 may be a liquid, such as water or a mixture or solution such as a paste, that improves the ability of the material of the rope 120 to bind the clefts 122, 124, together and thereby maintain a closed rope 120 around the deposited filler material 126.

Figure 8B:
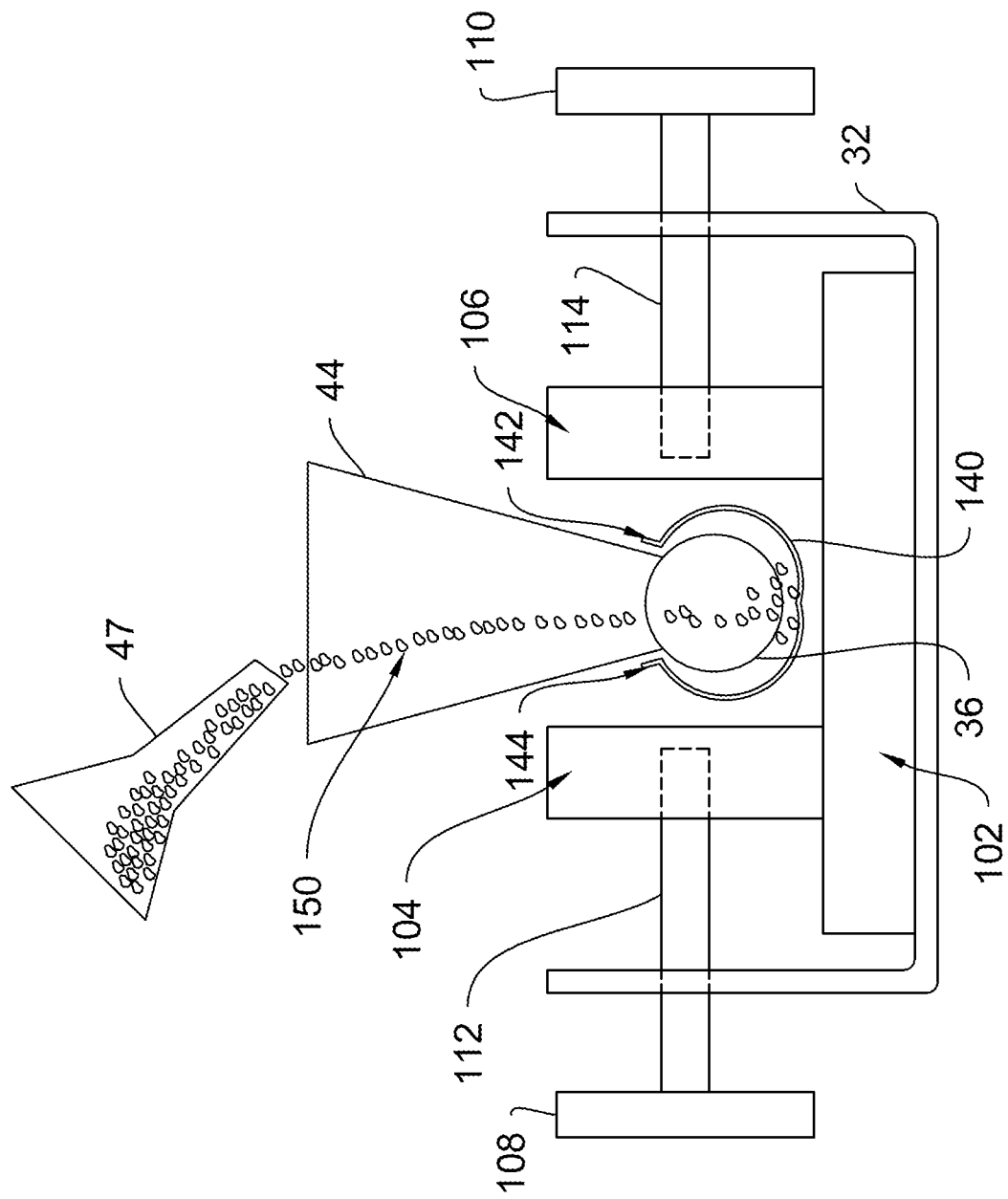

FIGS. 8A-8D illustrate stages of yet another example of a post-extrusion filling process in which an extruded rope of material having a partial circular-shaped cross-section is filled and closed. In FIGS. 8A-8D, the former 22 is configured to receive and close an extruded rope of material 140 having a partial circular-shaped cross-section. Referring to FIG. 8A, the partial circular-shaped rope 140 has upwardly-extending edges 142, 144, e.g., as formed by the extrusion die 68 shown in FIG. 5D.

As with FIGS. 6B and 7C, FIG. 8B illustrates an axial view of the filler apparatus 14 as viewed from the front face of an extrusion die, in this case the extrusion die 68 that forms the rope of material 140. The filler apparatus 14 in this embodiment includes a guide having a component in the form of a supporting trough 32 that supports the rope of material 140 as it flows from the extrusion die 68 by the hopper 44 of a feeder 20 to the former 22. As with FIGS. 6B and 7C, the supporting trough 32 in FIG. 8B includes a supporting floor 102 on which the rope 140 flows, bounded by opposing side walls 104, 106. The supporting trough 32 directs the rope of material 140 toward the former 22 as previously described. Handle portions 108, 110 coupled to threaded portions 112, 114 adjustably position the side walls 104, 106 to provide a variable and adjustable width to the supporting trough 32.

As the rope of material 140 flows by the hopper 44, the upper edges 142, 144 of the rope 140 are aligned with and/or adjacent to the outlet of the hopper 44 so that a filler material 150, fed from a filler source 47 into the hopper 44, is guided into the interior of the rope 140 by the hopper 44. In the embodiment shown in FIG. 8B, the filler apparatus 14 further includes a guide having a component in the form of a circular body positioned within the rope of material 140. The circular body, which may have a wedge-shaped or cone-shaped leading edge, preferably has a diameter large enough to push apart the upper edges 142, 144 of the rope 140 and thereby open or widen the opening in the rope of material 140 through which the filler material 150 may pass from the hopper 44 into the interior of the rope 140.

Turning to FIG. 8C, after the filler material 150 is deposited into the rope of material 140, the rope 140 flows through a former 22 that has a lower sidewall 148 and an upper sidewall 146 that together have a profile that approximately matches the partial circular cross-section of the rope 140. As the rope 140 continues to flow through the former 22, the sides of a channel in the upper sidewall 146 may converge and thereby push the upwardly-extending edges 142, 144 of the rope 140 toward each other. The converging upper edges 142, 144 may further be directed between rollers 154 that cause the upper edges 142, 144 to meet and fully converge as shown in FIG. 8D, resulting in a closed rope 140 that retains the filler material 150 inside the rope.

A sealer 24 may facilitate sealing of the rope of material 140. In various embodiments, the sealer 24 may apply a sealing agent 152 to inner sides of one or both of the upwardly-extending edges 142, 144 prior to or concurrently with the edges 142, 144 being brought together, e.g., by rollers 154 as illustrated in FIG. 8D. The sealing agent 152 may be a liquid such as water or a mixture of material such as a paste that is configured to improve the ability of the material of the rope 140 to bind the edges 142, 144 together and thereby provide the closed rope 140 around the deposited filler material 150. Alternatively or in addition, in various embodiments, the sealer 24 may mechanically press portions of the rope together to form a seal that seals at least a portion of the rope of material around the deposited filler material. For example, the rollers 154 in FIG. 8D may be configured to exert sufficient pressure on the upwardly-extending edges 142, 144 to press the edges 142, 144 together and cause the material at the edges 142, 144 to bind together. Mechanically pressing portions of the rope together includes mechanically pinching or otherwise pushing portions of the rope together to seal at least a portion of the rope around the deposited filler material.

Figure 9D:
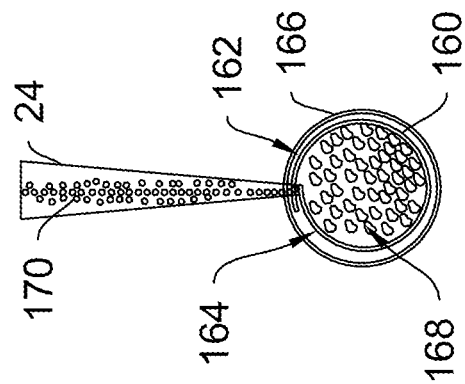
FIGS. 9A-9D pictorially illustrate stages of still another example of a post-extrusion filling process in which an extruded rope of material having an overlapping circular-shaped cross-section is filled and closed.
Figure 9C:
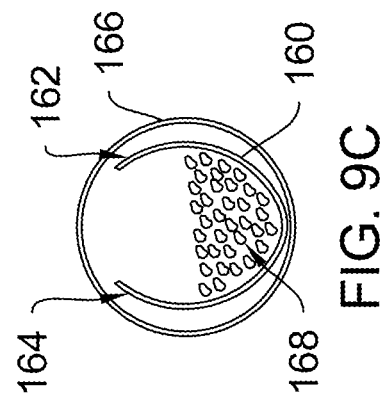
Figure 9A:
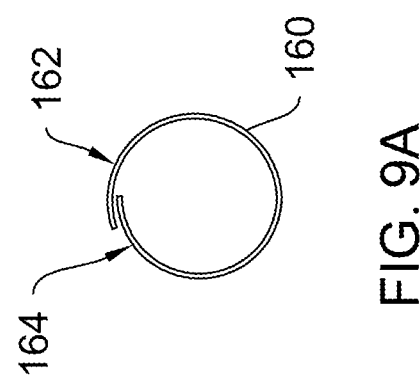
Figure 9B:
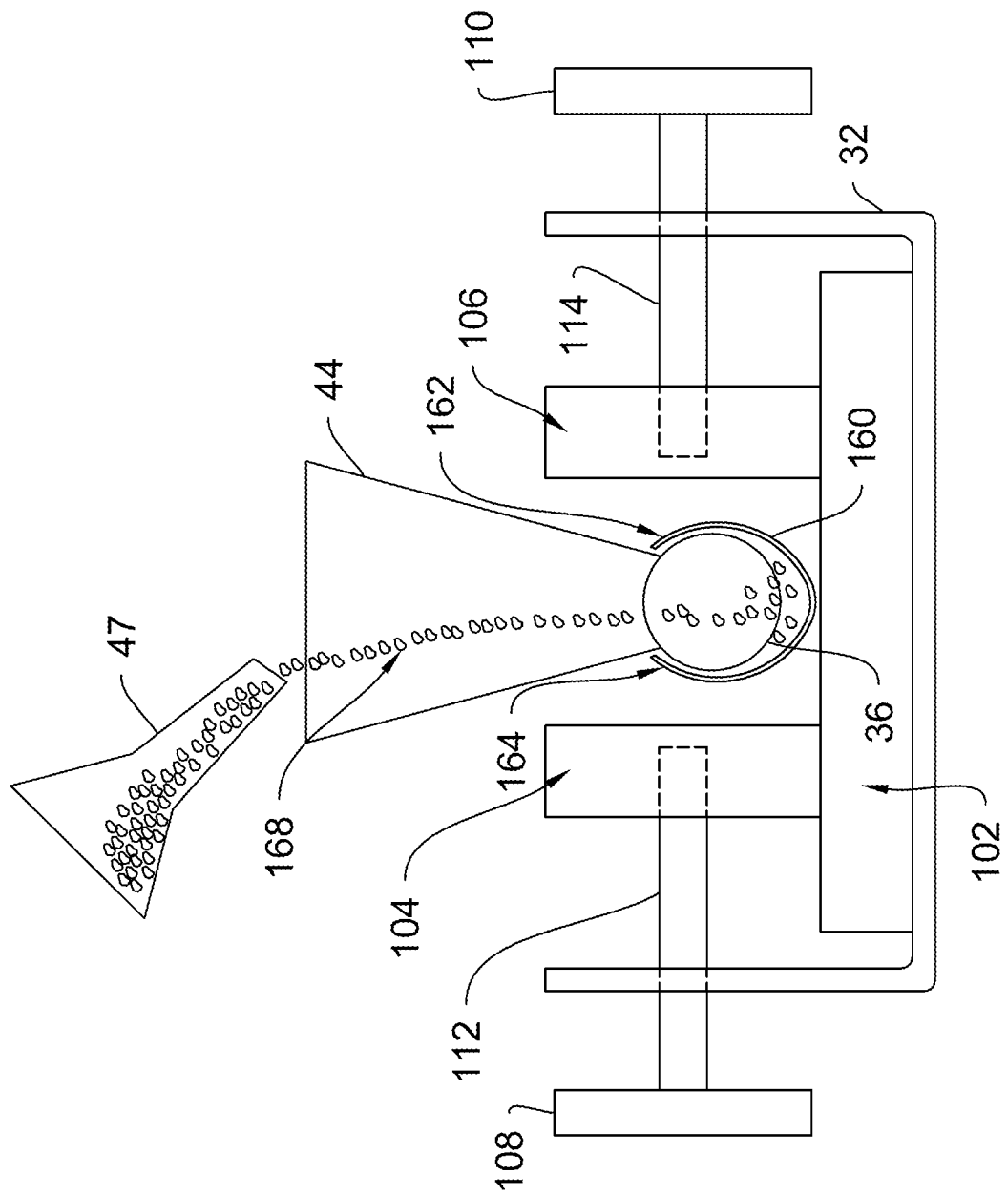

FIGS. 9A-9D illustrate stages of still another example of a post-extrusion filling process in which an extruded rope of material having an overlapping circular-shaped cross-section is filled and closed. In FIGS. 9A-9D, the former 22 is shown configured to receive and close an extruded rope of material 160 having an overlapping circular-shaped cross-section. Referring to FIG. 9A, the circular-shaped rope 160 has overlapping upper edges 162, 164, e.g., as formed by the extrusion die 74 shown in FIG. 5E.

As with FIGS. 6B, 7C, and 8B, FIG. 9B illustrates an axial view of the filler apparatus 14 as viewed from the front face of an extrusion die, in this case the extrusion die 74 in FIG. 5E. The filler apparatus 14 in this embodiment includes a guide in the form of a supporting trough 32 that supports the rope of material 160 as it flows from the extrusion die 74 by the hopper 44 toward the former 22 as described herein with respect to other embodiments. The supporting trough 32 in FIG. 9B includes a supporting floor 102, opposing side walls 104, 106, and handle portions 108, 110 coupled to threaded portions 112, 114 that adjustably position the side walls 104, 106 to provide the supporting trough 32 with a variable and adjustable width. The filler apparatus 14 further includes a guide in the form of a circular body that is positioned within the rope of material 160. As with the circular body in FIG. 8B, the circular body in FIG. 9B may have a wedge-shaped or cone-shaped leading edge and an expanding diameter that eventually is large enough to push apart the upper edges 162, 164 of the rope 160 and thereby open or widen the opening in the rope of material 160 through which the filler material 168 may pass into the interior of the rope 160.

The upper edges 162, 164 of the rope 160 are aligned with and/or adjacent to the outlet of the hopper 44 so that, as the rope of material 160 flows by the hopper 44, filler material 168 fed from a filler source 47 into the hopper 44 is guided by the hopper 44 into the interior of the rope 160. After the filler material 168 is deposited into the rope of material 160, the rope 160 flows into a receiving end of a former 166 as shown in FIGS. 9C and 9D. In this embodiment, the former 166 has a circular profile that approximately matches the opened, partial circular cross-section of the rope 160, as shown in FIG. 9C. Downstream of the receiving end, the circular shape of the former 166 may have one or more interior sidewalls with a diminishing diameter that bear upon an outer surface of the rope 160 and pushes the upper edges 162, 164 of the rope 160 toward each other.

In this embodiment, the upper edges 162, 164 meet and possibly again overlap, as illustrated in FIG. 9D, resulting in a closed rope 160 that retains the filler material 168 inside. Similar to previous embodiments shown in FIGS. 7D and 8C, a sealer 24 shown in FIG. 9D may facilitate a sealing of the rope of material 160 by applying a sealing agent 170 to one or both of the upper edges 162, 164 prior to or concurrently with the edges 162, 164 being brought together. The sealing agent 170 may be water or other mixture of material such as a paste that is preferably formulated to improve the ability of the material of the rope 160 to bind the overlapping edges 162, 164 together and thereby close the rope 160 in a sealing manner around the deposited filler material 168.

FIGS. 10A-10E illustrate stages of a further example of a post-extrusion filling process in which an extruded rope of material having a semi-heart shaped cross-section is filled and closed. In FIGS. 10A-10E, the former 22 is shown configured to receive and close an extruded rope of material 180 having a semi-heart shaped cross-section. Similar to the semi-heart shaped rope 120 shown in FIG. 7A, the semi-heart shaped rope 180 in FIG. 10A has upper curved clefts 182, 184, e.g., as formed by the extrusion die 62 shown in FIG. 5C. Likewise, similar to the embodiment shown in FIG. 7B, the filler apparatus 14 in FIG. 10B includes a cutter 19 with a cutting edge arranged to axially cut the rope of material 160 between the clefts 182, 184 as the rope 180 flows from the extrusion die 62 toward the receiving end of the supporting trough 32 shown in FIG. 10C.

Figure 10C:
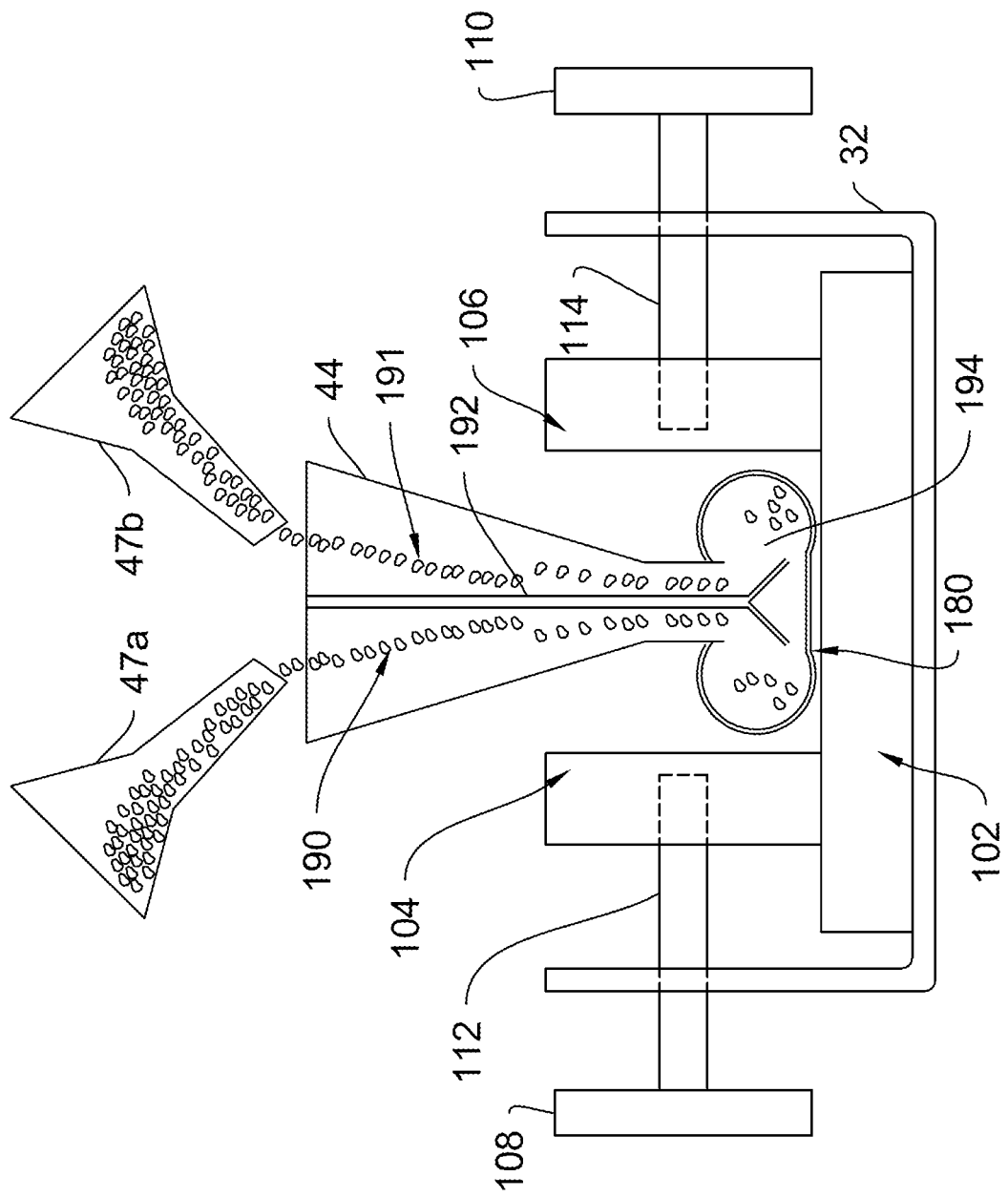

In the axial view shown in FIG. 10C, the supporting trough 32 includes a supporting floor 102, opposing side walls 104, 106, and handle portions 108, 110 coupled to threaded portions 112, 114 that adjustably position the side walls 104, 106 and provide the supporting trough 32 with a variable and adjustable width. The filler apparatus 14 may further include a guide, e.g., in the form of a tapered body (not shown in FIG. 10C) positioned within the rope of material 180, with wedge-shaped or cone-shaped leading edge that pushes apart the upper clefts 182, 184 of the rope 180 and thereby open or widen the opening in the rope of material 180 through which filler material, such as filler materials 190, 191, may pass into the interior 194 of the rope 180.

The embodiment illustrated in FIG. 10C includes a feeder in the form of a hopper 44 having multiple outputs, wherein each output of the hopper 44 is arranged to deposit a different filler materials 190, 191 into the interior 194 of the rope 180. As the rope of material 180 flows by the hopper 44, the separated upper clefts 182, 184 of the rope 180 are aligned with and/or positioned adjacent to the multiple outputs of the hopper 44 so that the different filler materials 190, 191, are guided by the hopper 44 into the interior 194 of the rope 180. In the particular embodiment shown, a divider 192 is positioned within the hopper 44 to provide the multiple outputs. The divider 192 divides the hopper 44 into separate passages for the different filler materials 190, 191, that are fed into the hopper 44 by different filler sources 47a, 47b. In the embodiment shown in FIG. 10C, the divider 192 includes a forked lower end that directs the different filler materials 190, 191 to opposing sides within the interior 194 of the rope of material 180.

After the filler materials 190, 191 are deposited at opposite sides within the interior 194 of the rope 180, the rope 180 flows into the former 22 shown in FIG. 10D having a lower sidewall 188 and an upper sidewall 186 that are sized to receive the rope of material 180. The upper sidewall 186 may further be shaped with curved clefts that approximately match the cross-section of the rope 180 and meet at a center portion 187. As the rope 180 flows further through the former 22, the center portion 187 of the upper sidewall 186 converges downward toward the lower sidewall 188, causing the upper clefts 182, 184 to converge toward a bottom sidewall of the rope 180. In this embodiment, the upper clefts 182, 184 eventually meet the bottom portion of the rope 180 as illustrated in FIG. 10E, thus providing a closed rope 120 comprised of separable smaller ropes of material that retain the filler materials 190, 191, respectively, inside the smaller ropes.

In FIG. 10E, the center portion 187 of the upper sidewall 186 also converges with the lower sidewall 186 such that the center portion 187 (or a cutting edge attached thereto) serves to cut the rope of material 180 axially along the bottom surface of the rope 180 to separate the rope 180 into smaller ropes of material. The smaller ropes of material may then be processed, jointly or separately, by the finisher 16. In other embodiments, the finisher 16 may be arranged to receive the rope of material 180 and cut the bottom surface of the rope 180 to separate the rope 180 into smaller ropes of material.

As noted previously, an optional sealer 24 (see FIG. 2) may be configured to act, possibly in cooperation with the former 22, to apply a sealing agent 132, 152, 170, (see FIGS. 7D, 8C, 9D) to one or both sides of the channel in the rope of material. The sealing agent facilitates sealing of the rope of material as the material is closed by the former 22 around the deposited filler material.

In embodiments where an extruded food product is being formed for example, the sealing agent 132, 152, 170 may be a starch-based liquid or paste, for example, that facilitates binding of the material of the rope 120 as the sealing agent 132 dries. For example, once applied, e.g. as illustrated in FIG. 7D, the starch-based liquid may bind the edges 122, 124 together when the mixture dries. Similar mixtures may be used for sealing agents 152 and 170 that are applied as shown in FIGS. 8C and 9D. In embodiments where a non-food product is being formed, the sealing agent may be an adhesive or glue that is suitable for binding the material of the extruded non-food rope.

Figure 11:
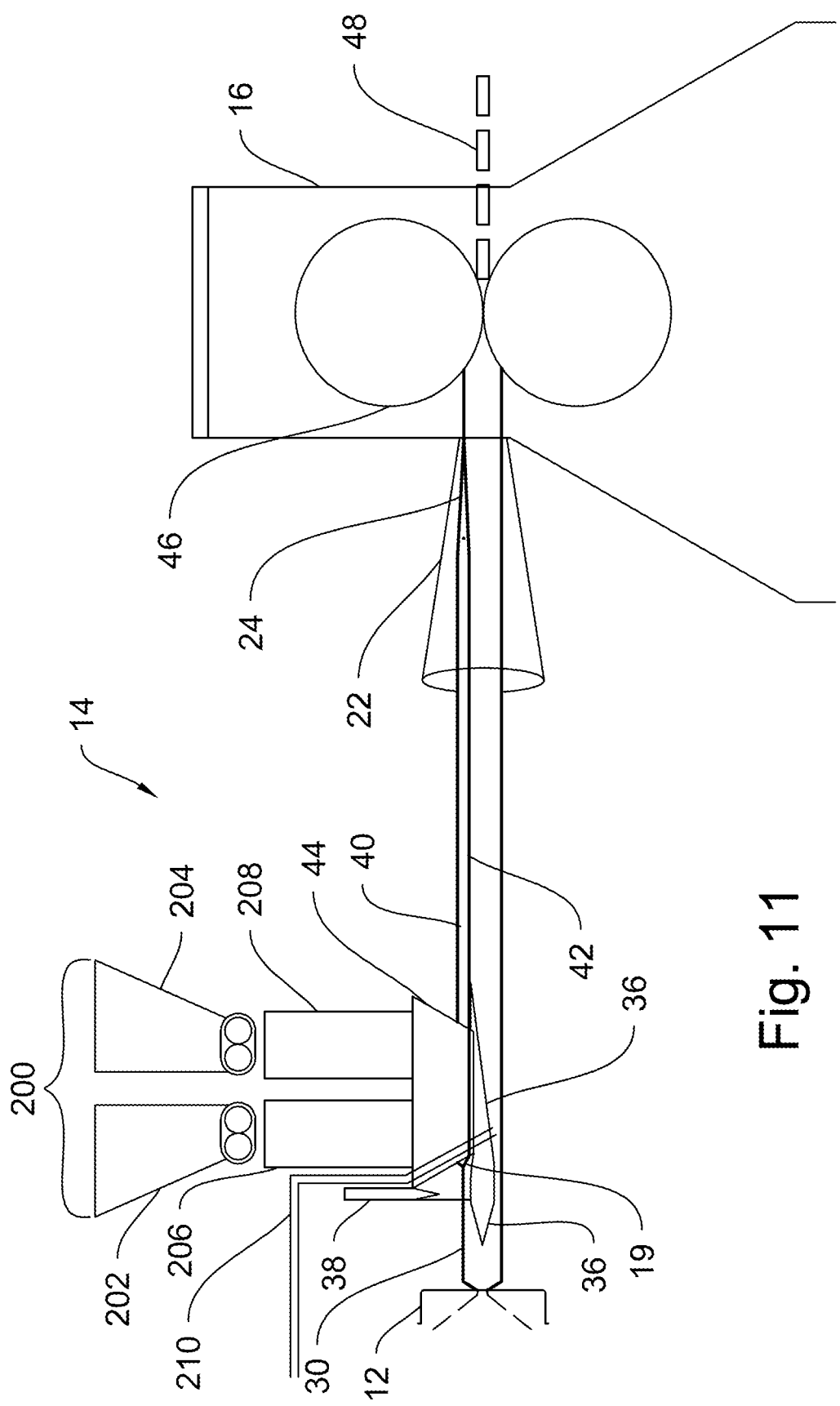
FIG. 11 is a pictorial diagram illustrating another embodiment of the extrusion system of FIG. 1, including an extruder, a filler apparatus for post-extrusion filling of an extrudate with multiple types of filler material, and a finisher for providing a finished extruded product.

FIG. 11 illustrates a side view of another embodiment of an extruder system including an extruder 12, a filler apparatus 14 for post-extrusion filling of an extrudate, and a finisher 16 for providing a finished extruded product. Features and elements of the filler apparatus 14 and finisher 16 in FIG. 11 that are similar to features and elements shown in FIG. 4 have like reference numerals. In FIG. 11, the filler apparatus 14 includes a feeder 200 that receives filler material from multiple, separate sources 202, 204 that respectively feed the filler material, which may be different filler material, into respective multiple, separate feeding channels 206, 208. The separate feeding channels 206, 208 direct the filler material into the hopper 44. In embodiments where the hopper 44 does not have a divider, such as the divider 192 shown in FIG. 10C, the filler materials fed from the feeding channels 206, 208 may mix as the filler materials pass through the hopper 44 into the interior of the extruded rope of material 30. In embodiments where the hopper 44 has a divider, such as the divider 192 shown in FIG. 10C, the different filler materials fed from the feeding channels 206, 208 are kept separate as the filler materials are deposited into the interior of the rope 30.

In addition to the multiple, separate filler material sources 202, 204 and the multiple, separate feeding channels 206, 208, the feeder 200 shown in FIG. 11 includes a filler tube 210 configured and arranged to deposit a further filler material, typically in form of a liquid, gel, or foam, into the interior of the extruded rope 30. In various embodiments, the filler material in the filler tube 210 may be pressurized to provide a controllable flow of filler material into the rope 30. In other embodiments, the filler tube 210 may use gravity to deposit the filler material into the rope 30. In yet further embodiments, the feeder 200 may include multiple filler tubes 210 that provide a flow of filler materials, possibly of different types or forms, whether pressurized and/or gravity fed, into the interior of the rope 30.

From the foregoing description, it should also be understood that portions or all of the filler apparatus 14 may be duplicated in embodiments where multiple instances of the filler apparatus 14 are needed. For example, the extruder 12 may have an extrusion die with multiple orifices that produce multiple extruded ropes of material. Alternatively or in addition, the extruder 12 may have multiple extrusion dies, each with an orifice, that collectively produce multiple extruded ropes of material. Each instance of the duplicated filler apparatus 14 may receive and process, for example, one of the multiple extruded ropes of material. Thus the present disclosure encompasses embodiments in which the feeder and former as previously described herein are a first feeder and a first former that are configured respectively to receive a first extruded rope of material from the extrusion die of the extruder, deposit filler material into the opening of the first rope, and shape of the first rope to close a portion or all of the first rope around at least a portion of the deposited material. The embodiment further includes at least a second feeder and a second former that are configured respectively to receive a second extruded rope of material from the extrusion die of the extruder, deposit filler material into an opening of the second rope, and shape the second rope to close a portion or all of the second rope around at least a portion of the deposited filler material.

In some implementations, the extruder 12 does not have an extrusion die with multiple orifices that produce multiple extruded ropes of material, but instead has multiple extrusion dies that each produce an extruded rope of material. In such implementations, each extrusion die may have a filler apparatus 14 as described herein to facilitate depositing of filler material into the interior of the rope of material produced by the respective extrusion die.

Additionally, it should be understood that the present disclosure encompasses methods for post-extrusion filling and closing of an extrudate. Such methods may be performed using a filler apparatus 14 as described herein, or one or more variations thereof. In various embodiments, such methods may include receiving an extruded rope of material flowing from an extrusion die of an extruder, wherein the rope of material has an opening that can receive a filler material, depositing a filler material into the opening of the rope of material, and shaping the rope of material to close a portion or all of the rope of material wholly or partially around the deposited filler material to retain at least a portion of the filler material within the rope. The shaping of the rope of material may be performed as the rope of material continues to flow from the extruder In various embodiments, the method may further comprise axially cutting the rope of material as the rope of material flows from the extrusion die, and using the cut in the rope of material to form the opening into which the filler material is deposited.

In various embodiments, the method may further comprise arranging the rope of material to flow toward a guide having a wedge-shaped or cone-shaped leading edge that opens or widens the channel as the rope of material flows past the leading edge of the guide. Alternatively, or in addition, the method may further comprise providing a guide in the form of a supporting trough that receives and supports the extruded rope of material flowing from the extrusion die.

In various embodiments, the filler material may be deposited into the opening of the rope by pressurized injection of the filler material. Alternatively, or in addition, the filler material may be deposited into the opening of the rope by gravity feeding of the filler material. In various embodiments, multiple different filler materials may be deposited into the opening of the rope.

In various embodiments, the rope of material is shaped by a former that has a tapered passage with one or more interior sidewalls that bear upon the rope of material and cause a portion or all of the rope of material to close upon itself around the deposited filler material as the rope of material flows through the passage. In such embodiments, the one or more interior sidewalls of the former may cause opposing sides of the rope of material to close upon itself around at least a portion of the deposited filler material and form separable smaller ropes of material containing the deposited filler material. When depositing the filler material, the different filler materials may be deposited adjacent opposing sides of the rope of material such that the separable smaller ropes of material, when formed, contain different deposited filler material. The method may further comprise cutting the rope of material to separate the smaller ropes of material.

In various embodiments, the method may further comprise applying a sealing agent to one or more edges of the opening in the rope of material that facilitates sealing of the rope of material around the deposited filler material.

In various embodiments, the method may further comprise cutting the shaped rope of material into portions, possibly individual portions, that contain the deposited filler material.

In various embodiments, the method may further comprise exerting a pulling tension on the rope of material flowing from the extrusion die by the feeder, to be shaped, e.g., by the former, and closed around at least a portion of the deposited filler material without positioning a support beneath the rope of material.

The various embodiments described above can be combined to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus for post-extrusion filling and closing of an extrudate, comprising:
   a feeder arranged in relation to an extruded rope of material flowing from an extrusion die of an extruder, the rope of material having an opening that can receive a filler material, wherein the feeder is configured to deposit the filler material into the opening of the rope of material as the rope of material flows by the feeder;
   a former arranged to receive the rope of material after the feeder has deposited the filler material into the opening of the rope of material, wherein the former is configured to shape the rope of material and close a portion or all of the rope of material around at least a portion of the deposited filler material to retain the filler material within the rope of material; and
   a finisher configured to exert a pulling tension on the rope of material flowing from the extrusion die by the feeder and through the former without a supporting trough positioned beneath the rope of material.

2. The apparatus of claim 1, further comprising a cutter having a cutting edge arranged to axially cut the rope of material flowing from the extrusion die, wherein the cut in the rope of material is used to form the opening into which the filler material is deposited.

3. The apparatus of claim 1, further comprising a guide arranged to direct the flow of the rope of material, wherein the guide has a receiving end configured to receive the extruded rope of material flowing from the extrusion die and directs the rope of material as the rope flows toward the former.

4. The apparatus of claim 1, wherein the feeder includes a hopper that is arranged to receive filler material and direct the filler material into the opening of the rope.

5. The apparatus of claim 1, wherein the filler material is at least one of a granular or chopped material, a paste, a gel, or a foam material, or a combination thereof.

6. The apparatus of claim 1, wherein the feeder is configured to deposit the filler material into the opening of the rope by a pressurized injection of the filler material.

7. The apparatus of claim 1, wherein the feeder is configured to deposit the filler material into the opening of the rope by a gravity feed of the filler material.

8. The apparatus of claim 1, wherein the feeder is configured to deposit multiple, different filler materials into the opening of the rope.

9. The apparatus of claim 8, wherein the feeder has multiple outputs, and each output of the feeder is configured to deposit a different filler material into the opening of the rope as the rope flows by the feeder.

10. The apparatus of claim 1, wherein the former has a tapered passage with one or more interior sidewalls that bear upon the rope of material and cause a portion or all of the rope of material to close upon itself around the deposited filler material as the rope of material flows through the passage.

11. The apparatus of claim 10, wherein the tapered passage has a decreasing inside dimension such that the one or more interior sidewalls causes opposing sides of the rope of material to close upon itself around at least a portion of the deposited filler material and form separable smaller ropes of material containing the deposited filler material.

12. The apparatus of claim 11, wherein the feeder is configured to deposit different filler materials adjacent the opposing sides of the rope of material such that the separable smaller ropes of material, when formed, contain different deposited filler material.

13. The apparatus of claim 11, wherein the finisher is arranged to receive the rope of material shaped by the former and cut the rope of material to separate the smaller ropes of material.

14. The apparatus of claim 1, further comprising a sealer that mechanically presses portions of the rope together to facilitate sealing of at least a portion of the rope of material around the deposited filler material.

15. The apparatus of claim 14, wherein the sealer comprises rollers that receive and press together edges of the opening of the rope of material to form a seal that seals at least a portion of the rope of material around the deposited filler material.

16. The apparatus of claim 1, further comprising a sealer that applies a sealing agent to one or more edges of the opening of the rope of material, wherein the sealing agent facilitates sealing of at least a portion of the rope of material around the deposited filler material.

17. The apparatus of claim 1, wherein the finisher is arranged to receive the rope of material shaped by the former and cut the rope of material into portions that contain the deposited filler material.

18. The apparatus of claim 1, wherein the feeder and former are a first feeder and a first former configured respectively to receive a first extruded rope of material from the extruder, deposit filler material into the opening of the first rope of material, and shape the first rope of material to close a portion or all of the first rope of material around at least a portion of the deposited filler material, the apparatus further comprising at least a second feeder and a second former configured respectively to receive a second extruded rope of material from the extruder, deposit filler material into an opening of the second rope of material, and shape the second rope of material to close a portion or all of the second rope of material around at least a portion of the deposited filler material.

19. A method for post-extrusion filling and closing of an extrudate, comprising:
   receiving, by a feeder, an extruded rope of material flowing from an extrusion die of an extruder, the rope of material having an opening that can receive a filler material, wherein the feeder is arranged in relation to the extruded rope of material flowing from the extrusion die of the extruder and is configured to deposit the filler material into the opening of the rope of material as the rope of material flows by the feeder;
   depositing, by the feeder, a filler material into the opening of the rope of material;
   shaping, by a former, the rope of material to close a portion or all of the rope of material around the deposited filler material to retain at least a portion of the filler material within the rope of material, wherein the former is arranged to receive the rope of material after the feeder has deposited the filler material into the opening of the rope of material and is configured to shape the rope of material and close a portion or all of the rope of material around at least a portion of the deposited filler material to retain the filler material within the rope of material; and
   exerting, by a finisher, a pulling tension on the rope of material flowing from the extrusion die by the feeder, to be shaped and closed around at least a portion of the deposited filler material without positioning a supporting trough beneath the rope of material.

20. The method of claim 19, further comprising axially cutting, by a cutter, the rope of material as the rope of material flows from the extrusion die, and using the cut in the rope of material to form the opening into which the filler material is deposited.

21. The method of claim 19, wherein the filler material is deposited, by the feeder, into the opening of the rope by pressurized injection of the filler material.

22. The method of claim 19, wherein the filler material is deposited, by the feeder, into the opening of the rope by gravity feeding of the filler material.

23. The method of claim 19, wherein depositing the filler material includes depositing multiple, different filler materials into the opening of the rope.

24. The method of claim 19, wherein the rope of material is shaped by the former having a tapered passage with one or more interior sidewalls that bear upon the rope of material and cause a portion or all of the rope of material to close upon itself around the deposited filler material as the rope of material flows through the tapered passage.

25. The method of claim 24, wherein the one or more interior sidewalls cause opposing sides of the rope of material to close upon itself around at least a portion of the deposited filler material and form separable smaller ropes of material containing the deposited filler material.

26. The method of claim 25, wherein depositing the filler material by the feeder comprises depositing different filler materials adjacent the opposing sides of the rope of material such that the separable smaller ropes of material, when formed, contain different deposited filler material.

27. The method of claim 25, further comprising cutting, by a finisher, the rope of material to separate the smaller ropes of material.

28. The method of claim 19, further comprising pressing, by a sealer, portions of the rope together to facilitate sealing of at least a portion of the rope of material around the deposited filler material.

29. The method of claim 19, further comprising cutting, by a finisher, the shaped rope of material into portions that contain the deposited filler material.

30. A method for post-extrusion filling and closing of an extrudate, comprising:
 receiving, by a feeder, an extruded rope of material flowing from an extrusion die of an extruder, the rope of material having an opening that can receive a filler material, wherein the feeder is arranged in relation to the extruded rope of material flowing from the extrusion die of the extruder and is configured to deposit the filler material into the opening of the rope of material as the rope of material flows by the feeder;
 depositing, by the feeder, a filler material into the opening of the rope of material;
 shaping, by a former, the rope of material to close a portion or all of the rope of material around the deposited filler material to retain at least a portion of the filler material within the rope of material, wherein the former is arranged to receive the rope of material after the feeder has deposited the filler material into the opening of the rope of material and is configured to shape the rope of material and close a portion or all of the rope of material around at least a portion of the deposited filler material to retain the filler material within the rope of material; and
 applying, by a sealer, a sealing agent to one or more edges of the opening that facilitates sealing of the rope of material around the deposited filler material.

31. An apparatus for post-extrusion filling and closing of an extrudate, comprising:
 a feeder arranged in relation to an extruded rope of material flowing from an extrusion die of an extruder, the rope of material having an opening that can receive a filler material, wherein the feeder is configured to deposit the filler material into the opening of the rope of material as the rope of material flows by the feeder;
 a former arranged to receive the rope of material after the feeder has deposited the filler material into the opening of the rope of material, wherein the former is configured to shape the rope of material and close a portion or all of the rope of material around at least a portion of the deposited filler material to retain the filler material within the rope of material; and
 a sealer that applies a sealing agent to one or more edges of the opening of the rope of material, wherein the sealing agent facilitates sealing of at least a portion of the rope of material around the deposited filler material.

32. The apparatus of claim 31, wherein the sealer is configured to press the rope together to facilitate sealing of at least a portion of the rope of material around the deposited filler material.

33. The apparatus of claim 31, wherein the sealer comprises rollers that receive and press together the one or more edges of the opening of the rope of material to form a seal that seals at least a portion of the rope of material around the deposited filler material.

34. The apparatus of claim 31, further comprising a finisher, wherein the finisher is configured to cut the shaped rope of material into portions that contain the deposited filler material.

\* \* \* \* \*